United States Patent
Quigley et al.

(10) Patent No.: US 9,805,370 B1
(45) Date of Patent: Oct. 31, 2017

(54) DEVICE FINGERPRINTING AT A MERCHANT LOCATION

(71) Applicant: Square, Inc., San Francisco, CA (US)

(72) Inventors: Oliver S. C. Quigley, San Francisco, CA (US); Collin Mulliner, Brooklyn, NY (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/087,581

(22) Filed: Mar. 31, 2016

(51) Int. Cl.
*G06Q 20/00* (2012.01)
*G06Q 20/40* (2012.01)
*G06Q 20/20* (2012.01)
*G06Q 20/10* (2012.01)
*G06Q 20/32* (2012.01)
*H04W 4/02* (2009.01)
*H04W 12/06* (2009.01)

(52) U.S. Cl.
CPC ......... *G06Q 20/4014* (2013.01); *G06Q 20/10* (2013.01); *G06Q 20/204* (2013.01); *G06Q 20/3278* (2013.01); *H04W 4/021* (2013.01); *G06Q 20/206* (2013.01); *H04W 12/06* (2013.01)

(58) Field of Classification Search
CPC ............. G06Q 20/204; G06Q 20/3674; G06Q 20/206; H04W 12/06
USPC ....... 705/17, 44, 67, 16, 18, 21, 64; 455/411
See application file for complete search history.

(56) References Cited

U.S. PATENT DOCUMENTS

| | | | |
|---|---|---|---|
| 7,707,089 B1 | 4/2010 | Barton et al. | |
| 7,752,135 B2 | 7/2010 | Brown et al. | |
| 8,499,355 B1 | 7/2013 | Goncharov | |
| 8,635,117 B1 | 1/2014 | Acuna-Rohter | |
| 8,990,121 B1 * | 3/2015 | Guise | G06Q 20/3829 705/71 |
| 9,569,767 B1 | 2/2017 | Lewis et al. | |
| 2003/0112942 A1 | 6/2003 | Brown et al. | |
| 2007/0150387 A1 | 6/2007 | Seubert et al. | |
| 2008/0035725 A1 | 2/2008 | Jambunathan et al. | |

(Continued)

OTHER PUBLICATIONS

Non-Final Office Action dated Aug. 16, 2016, for U.S. Appl. No. 14/578,765, of Chi, Y., et al., filed Dec. 22, 2014.

(Continued)

*Primary Examiner* — Hunter Wilder
(74) *Attorney, Agent, or Firm* — Lee & Hayes, PLLC

(57) ABSTRACT

In some examples, methods and systems may process one or more payment transactions between a merchant and a buyer by registering a communication device as an authorization instrument to the payment transaction. To this end, the method includes detecting at least one transaction activity associated with a payment system, establishing a communication channel between the POS terminal an RF communication device in proximity to the POS terminal. Then obtaining at least one device characteristic of the communication device, wherein the device characteristic is related to the operational or physical features of the communication device; generating a digital fingerprint based in part on the obtained device characteristic and the information related to received payment object; determining whether the digital fingerprint substantially compares to an existing fingerprint in a database and if the existing fingerprint is substantially similar to the digital fingerprint, authorizing the payment transaction through presence of the communication device.

26 Claims, 10 Drawing Sheets

(56) References Cited

U.S. PATENT DOCUMENTS

| | | | |
|---|---|---|---|
| 2008/0275760 A1 | 11/2008 | Easterly et al. | |
| 2009/0094126 A1 | 4/2009 | Killian et al. | |
| 2010/0332400 A1* | 12/2010 | Etchegoyen | G06F 21/32 705/44 |
| 2011/0153438 A1 | 6/2011 | Dragt | |
| 2012/0030116 A1 | 2/2012 | Shirey et al. | |
| 2012/0084203 A1* | 4/2012 | Mehew | G06Q 20/40 705/44 |
| 2012/0330840 A1 | 12/2012 | Stinchcombe | |
| 2013/0189953 A1* | 7/2013 | Mathews | H04W 12/06 455/411 |
| 2013/0246187 A1 | 9/2013 | Chau et al. | |
| 2014/0172700 A1 | 6/2014 | Teuwen et al. | |
| 2014/0279518 A1 | 9/2014 | Acuna-Rohter | |
| 2015/0206416 A1 | 7/2015 | Marra et al. | |
| 2016/0110718 A1 | 4/2016 | Jajara et al. | |

OTHER PUBLICATIONS

Final Office Action dated Mar. 9, 2017, for U.S. Appl. No. 14/578,765, of Chi, Y., et al., filed Dec. 22, 2014.
"Advancing Payment Security: MasterCard Contactless Security Overview," www.mastercard.com, retrieved from Internet URL: https://www.mastercard.com/contactless/doc/MasterCardContactless_SecurityFactSheet_2015.pdf, on Jun. 12, 2017, pp. 1-4.
Non-Final Office Action dated Jan. 2, 2015, for U.S. Appl. No. 14/271,379, of Lewis, J., et al., filed May 6, 2014.
Final Office Action dated Jun. 26, 2015, for U.S. Appl. No. 14/271,379, of Lewis, J., et al., filed May 6, 2014.
Non-Final Office Action dated Sep. 11, 2015, for U.S. Appl. No. 14/271,368, of Lewis, J., et al., filed May 6, 2014.
Non-Final Office Action dated Jan. 20, 2016, for U.S. Appl. No. 14/271,368, of Lewis, J., et al., filed May 6, 2014.
Non-Final Office Action dated Mar. 31, 2016, for U.S. Appl. No. 14/271,379, of Lewis, J., et al., filed May 6, 2014.
Non-Final Office Action dated Jul. 5, 2016, for U.S. Appl. No. 14/271,350, of Lewis, J., et al., filed May 6, 2014.
Final Office Action dated Jul. 29, 2016, for U.S. Appl. No. 14/271,368, of Lewis, J., et al., filed May 6, 2014.
Final Office Action dated Oct. 6, 2016, for U.S. Appl. No. 14/271,379, of Lewis, J., et al., filed May 6, 2014.
Notice of Allowance dated Oct. 13, 2016, for U.S. Appl. No. 14/271,368, of Lewis, J., et al., filed May 6, 2014.
Advisory Action dated Dec. 29, 2016, for U.S. Appl. No. 14/271,379, of Lewis, J., et al., filed May 6, 2014.
Final Office Action dated Jan. 18, 2017, for U.S. Appl. No. 14/271,350, of Lewis, J., et al., filed May 6, 2014.

* cited by examiner

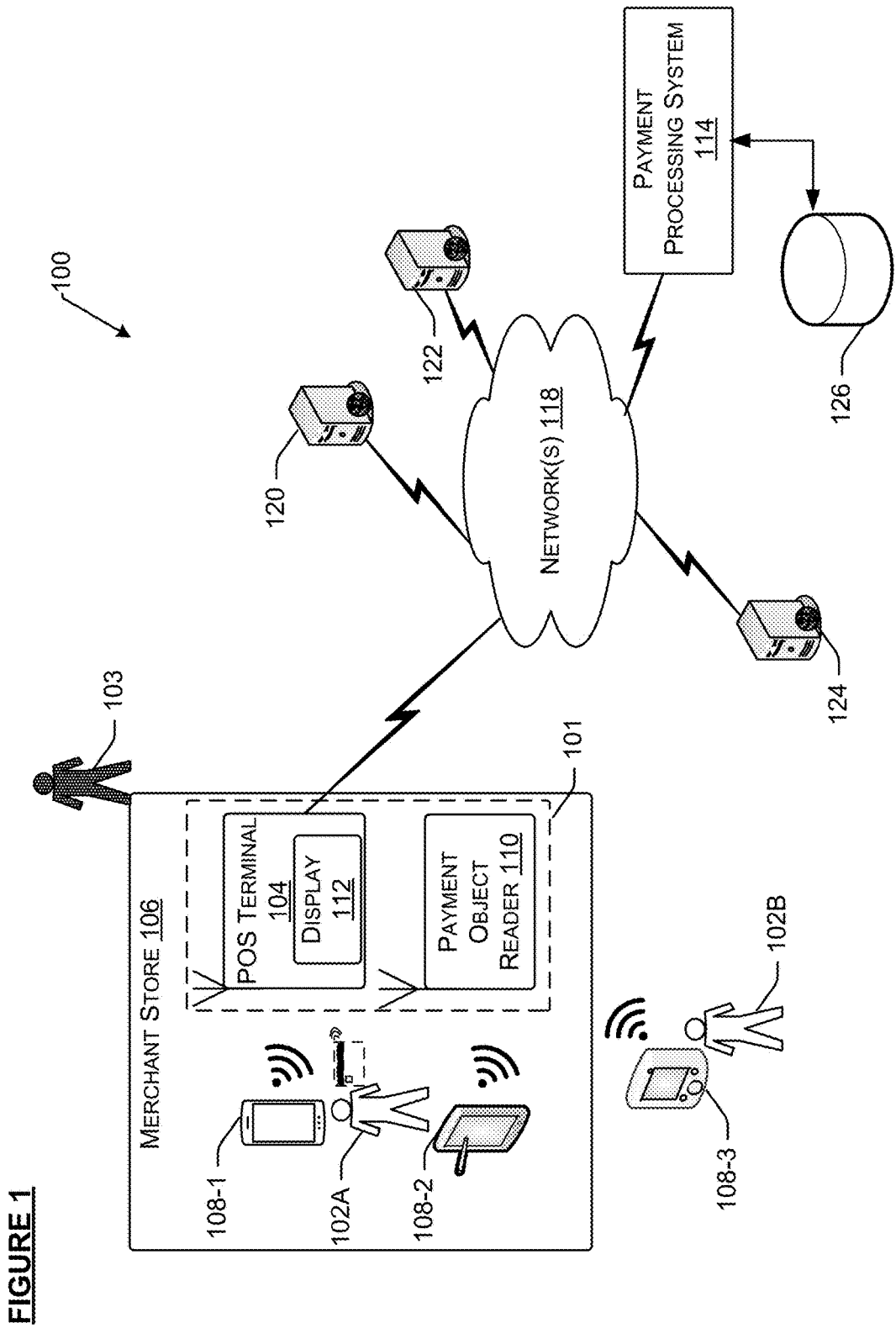

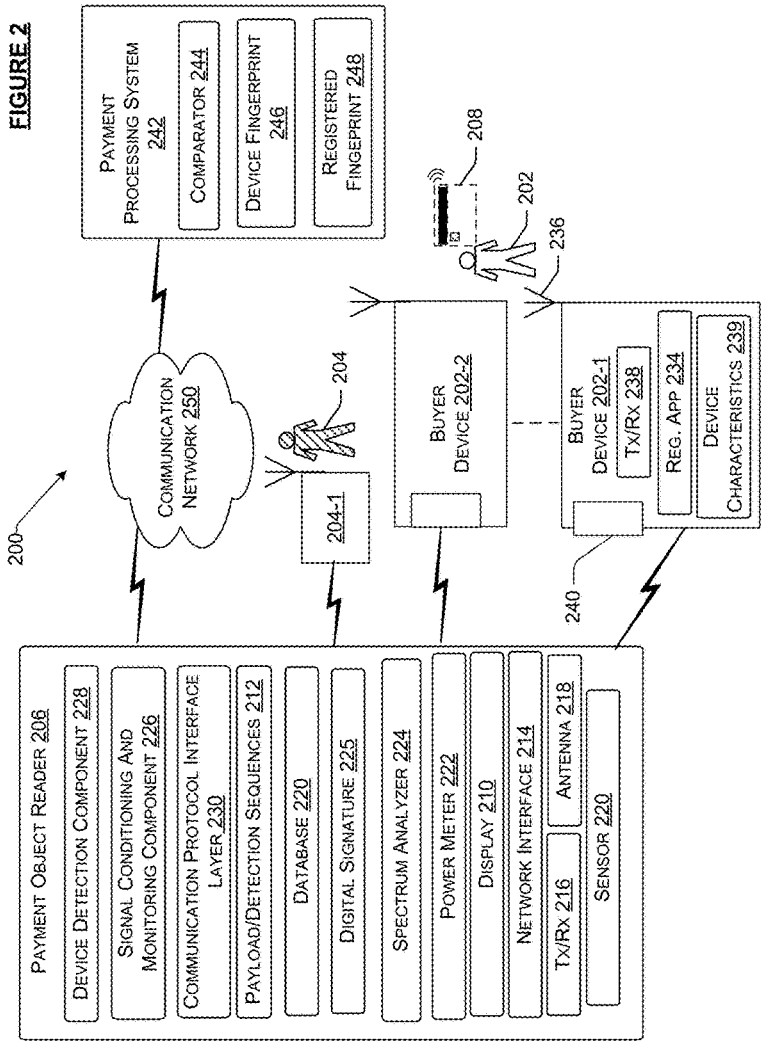

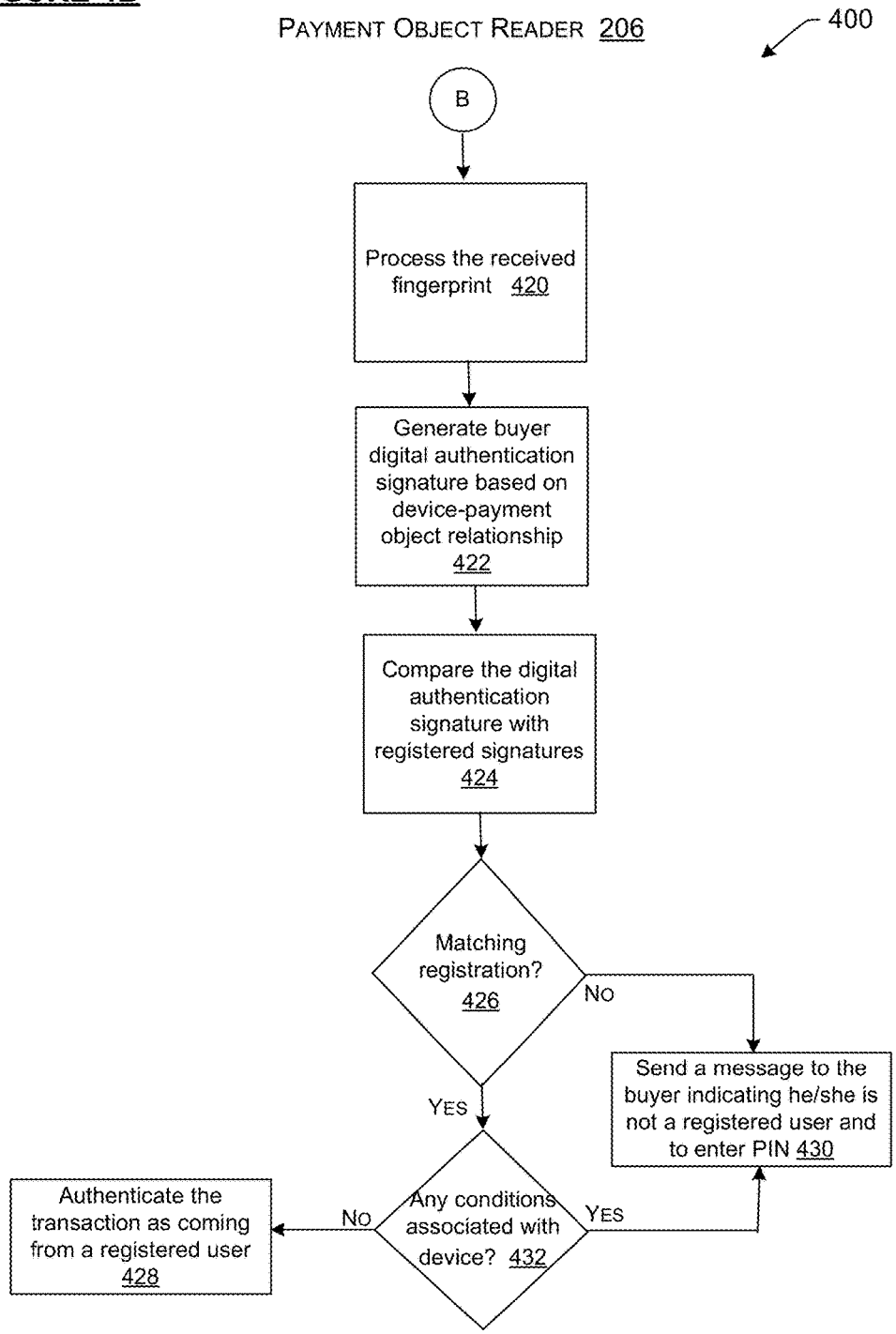

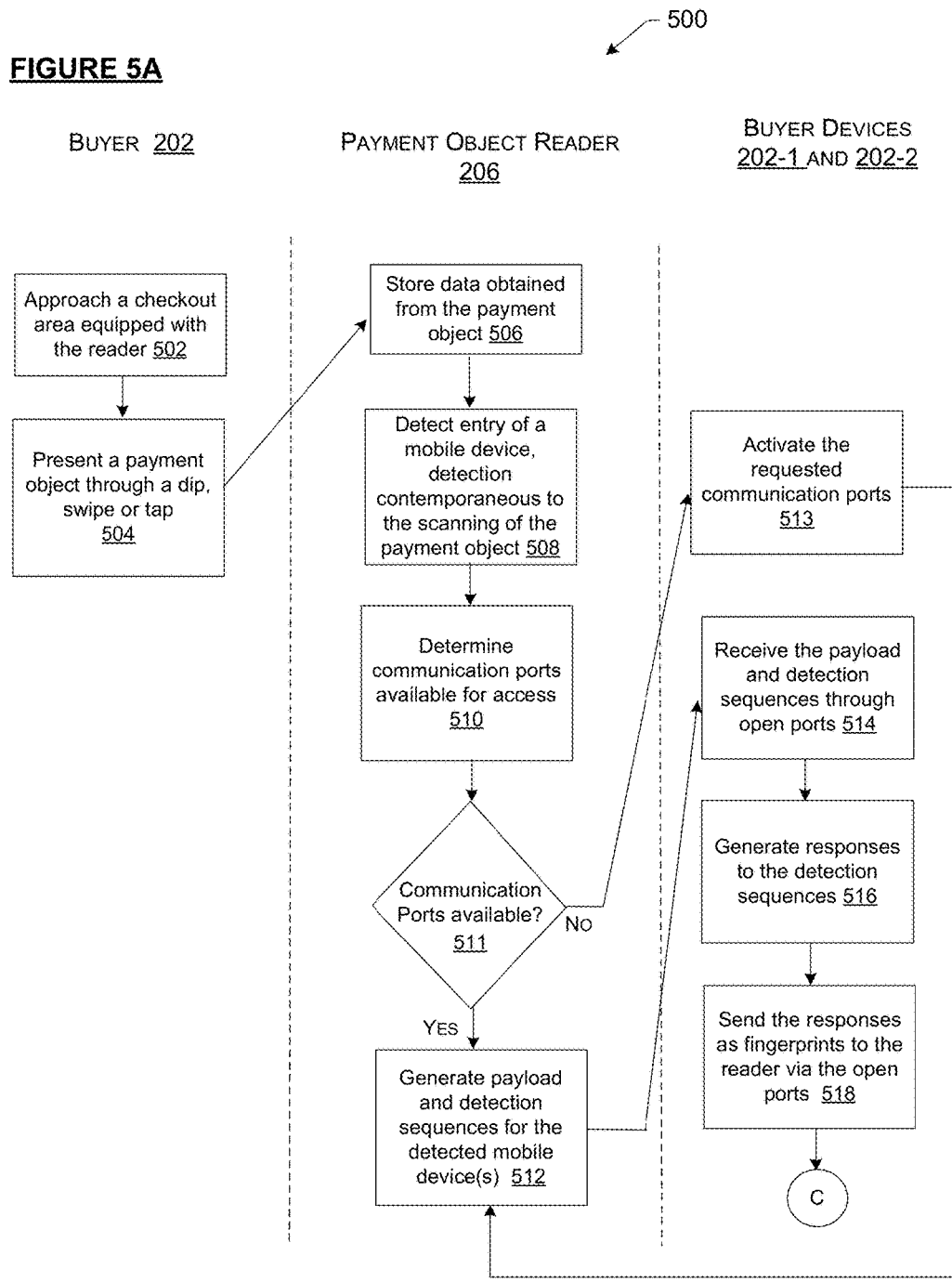

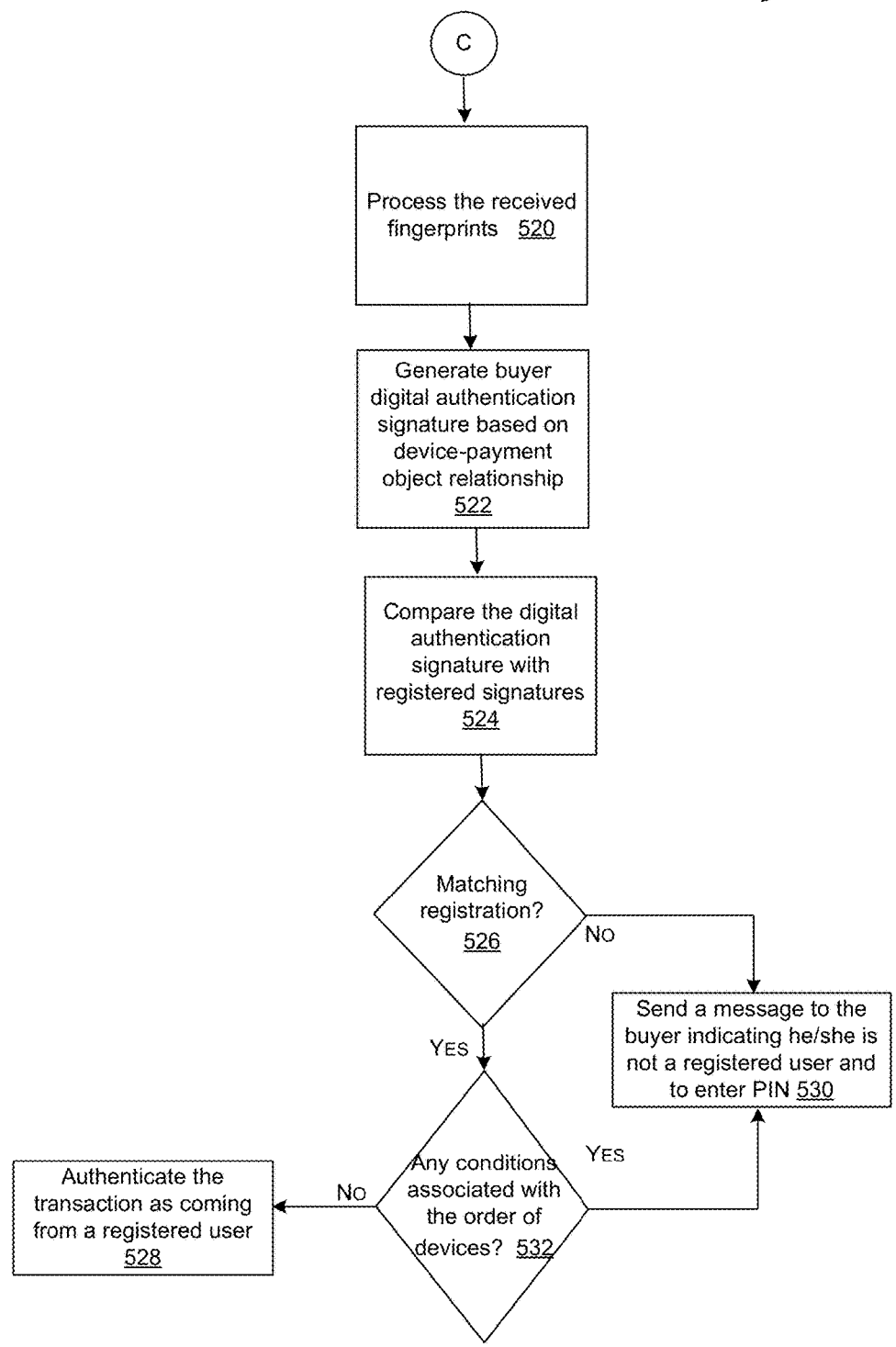

DEVICE FINGERPRINTING AT A MERCHANT LOCATION

TECHNICAL FIELD

Generally, a merchant requests a buyer to provide a payment card (e.g., a credit card or a debit card) to pay for a product or service. The merchant inserts or taps the payment card onto a card reader connected to a point-of-sale terminal, which facilitates processing of an electronic payment transaction between the merchant and the buyer.

For security purposes, the merchant generally requests the buyer to present a proof of identification along with the payment card. The method of verification is usually in the form of a government issued identity card, billing address associated with the payment card, a security code of the payment card, social security number of the buyer, phone number of the buyer, or a combination of all. However, these modes of verification simply confirm that the buyer has physical possession of the payment card, and not necessarily that the buyer is the true owner of the card or is even authorized to use the card.

In the absence of reliable payment instruments, and verification and authorization of such instruments, fraudulent payment transactions have been on the rise, as fraudsters can fraudulently obtain complete information about a payment card including personal identifying information, passwords, and card verification value.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

FIG. 1 is a network environment illustrating interaction between a point-of-sale (POS) terminal and a payment object reader, which when receives a method of payment, such as a credit card, registers and/or detects a known device associated with the method of payment, according to an embodiment of the present subject matter.

FIG. 2 is a diagram illustrating registration of a buyer device and subsequent detection of the buyer device to authorize a payment transaction, according to an embodiment of the present subject matter.

FIGS. 4A and 4B are sequence diagrams illustrating a method of detecting a registered device at the time of a payment transaction, according to an embodiment of the present subject matter.

FIGS. 5A and 5B are sequence diagrams illustrating a method of detecting a cluster of registered devices at the time of a payment transaction, according to another embodiment of the present subject matter.

DETAILED DESCRIPTION

Figure 3A:
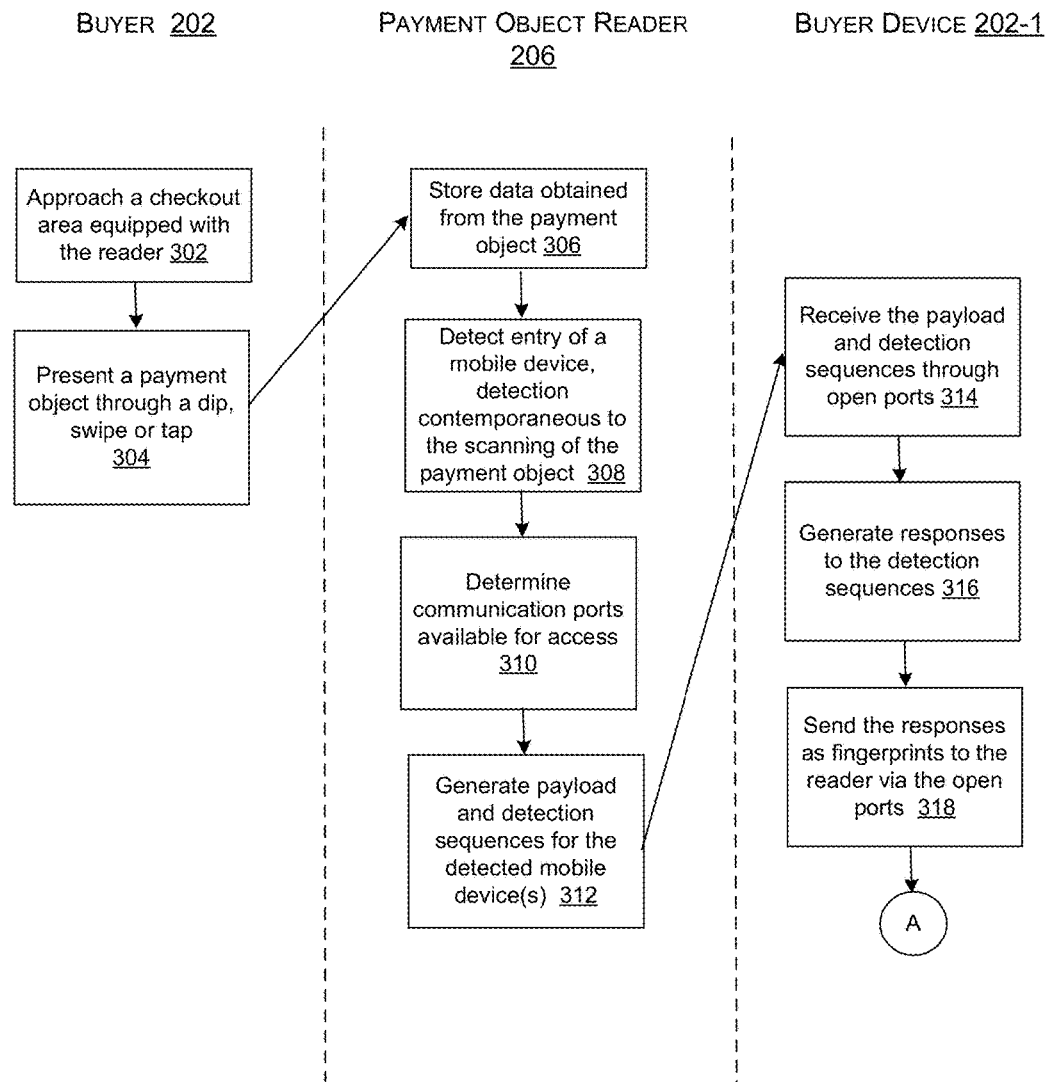
FIGS. 3A and 3B are sequence diagrams illustrating a method of registering a buyer's device as an authorization instrument with a payment processing system, according to an embodiment of the present subject matter.

Some implementations described herein include methods and systems that enable buyers to authorize a payment transaction without or minimal buyer intervention, for example by confirming presence of a buyer device or a cluster of buyer devices after a buyer's credit card or debit card has been presented to furnish a payment transaction. The presence of a previously detected (and/or registered) buyer device or cluster of devices allows a payment processor to accept the payment as an authorized payment transaction without requesting the buyer to enter an authentication code like a password or PIN associated with the method of payment. The payment transaction is a proximity payment transaction in some cases, which means the entities involved in the transaction, the buyer and seller devices are in proximity to each other, or within a communication range defined by the communication protocol on which each other interacts.

The disclosed methods and systems obtain and register characteristics of a communication device, e.g., buyer phones, wearable devices, and other communication devices associated with the buyer during a first transaction made with a buyer's credit card or debit card, or as part of a registration process included in an interactive receipt. The characteristics are device characteristics such as manufacturing or engineering tolerances, timing parameters, associated behaviors, etc. Once a relationship is made between the buyer's credit card and the communication device of the buyer at the time of transaction, the buyer can authorize all subsequent transactions by ensuring that the communication device is present when performing transaction with the credit card. The presence of the communication device in conjunction with the credit card, both registered in a central processor, is used to validate or authenticate the payment transaction without the buyer having to input a security code or presenting other form of credential information. This method is referred to as device fingerprinting.

Generally, a payment transaction involves a buyer providing a payment card, such as a credit card or debit card, to pay for a product or service that the buyer purchases from a merchant. The credit card is swiped or dipped into a card reader, which is connected to or included within a point-of-sale (POS) terminal. The POS terminal generates a payment request in response to the swiping action and based on the data collected from the credit card. The POS terminal electronically sends the payment request to a payment card processor over an available network for authorization.

The payment card processor, with or without performing an analysis of the payment request, routes the request to a card network, e.g., Visa® or MasterCard®, which in turn sends the request to the card issuer, e.g., a bank, for approval. Usually, after a short delay, the POS terminal may receive an indication of whether the payment card has been approved (i.e., authorized) or declined (i.e., failed to authorize) for an amount of the transaction, such as a cost of the good or service. Assuming the card issuer approves the transaction, the payment card processor causes funds to be transferred from the buyer's bank account to a merchant's bank account, and optionally creates a receipt indicating successful processing of a payment transaction, which is sent to a buyer's phone.

Traditionally, the issuing bank authorizes the payment card, such as a debit card or credit card. Such a payment card can be generally used for three types of "in-store" credit card transactions, i.e., "buyer signature required", "no buyer signature required" and self check-out. In all such transactions, the buyer is prompted to sign a signature pad, which marks the completion of the credit card transaction. For Internet or telephone credit card transactions, online buyers places desired item(s) in an online shopping cart and once all item(s) have been selected, the buyer selects the option to checkout the online shopping cart. On selecting credit card as a method of payment, the buyer is prompted to enter a special PIN number imprinted on the back of the card for verification purposes. Similarly, transactions made on automatic or unmanned machines allow the buyer to purchase a product or service but asks the buyer to provide a proof of identity or verification, either in the form of signature or PIN number.

One of the problems with all such existing credit card transactions is that once the card is activated, it remains that way until the card is reported lost or stolen or the account is canceled or closed. During this time, any fraudulent party that gets access to the credit card information can use the credit card to their benefit and continue to do so until the owner of the credit card finds out and reports. While anti-fraud techniques, such as holograms, photo IDs, authorization codes, and signature matching are somewhat successful, such techniques still do not establish, with certainty, that the cardholder is indeed the card owner. Further, these techniques are difficult to implement in some cases, e.g., for Internet payment transactions in which the buyer is physically unavailable to provide confirmation. Furthermore, entering the PIN or signature adds friction to the overall payment process.

Conventional schemes also propose detecting devices through determination of the exact or estimated location of the device, for example, through GPS transmitter or receiver. Device detection also relates to determination whether or not the device is present, and not necessarily where the device is located. However, one can easily imagine a scenario where a device is stolen and a fraudster who is in possession of the device can trick the payment flow. Furthermore, device detection based merely on geo-fence penetration can be too simplistic in a world where a device can be made to feign another.

Some conventional methods detect devices based on unique identifiers such as the serial number of a device. For example, all Global System for Mobile Communication (GSM) phones have an International Mobile Station Equipment Identifier (IMEI), Android phones have a Unique Device Identifier (UDI), while Apple phones, as of iOS 6, have Advertising Identifier (IDFA). This identifier unique to each device but can be removed if the device is wiped by the user or a fraudulent user. Another potential identifier is IdentifierForVendor, the purpose of which is to link the device to the appropriate application vendor for analytics. This is not a problem. These identifiers have been used in the past for fingerprinting, but it only works for devices on which the user has installed that vendor's application. This is not a problem for the application developer, who only wants to be able to identify the device in his or her own application. However, for general fingerprinting, it has a major weakness by design. If the user deletes the application, or simply does not run it, the identifier will not be available. Because of Apple's sandbox functionality, the identifier is not available to other applications, so the fingerprint only works when the specific application is running—and then only for the application's developer.

With Android phones, the IMEI can be used as a unique hardware identifier and is accessible through the getDeviceID method. Each device also has a device serial number and Android ID. Both these unique numbers may be used to identify an Android device in a specific application. For example, these identifiers could be used to fingerprint a device in a cloud service provider's mobile application. However, just as with the iPhone, it is not feasible to create an application that can be loaded on all Android phones for the purpose of fingerprinting beyond a specific application. And just as with the iPhone, once the application is removed, the identifier is lost.

Other solutions involve giving the device its own unique identifier, like a cookie, and download a unique serial number with the application. However, a fraudulent user can circumvent this tactic by making the cookie static or by deleting the application and downloading a new copy with a new identity.

To avoid at least the aforementioned risks and to make the payment experience automated, the method and systems described herein disclose friction-less and secure payment authentication technology by fingerprint devices in a new and unique way. The technology is disclosed herein for methods and systems to identify and fingerprint communication devices based on physical, mechanical, electromechanical, and/or operational characteristics, and registering the devices (and a payment card) based on such parameters and treating them as payment authorization instruments. Then subsequently detecting presence of a buyer device or a cluster of devices at the time of transaction made by a card connected to the buyer device and using presence of such devices towards authentication of a payment transaction to securely and reliably process the buyer's transaction by retrieving the buyer's financial account associated with the swiped card.

In one implementation, the buyer registers his device or devices at the time of a first purchase, e.g., at the merchant's location, using the card reader provided for receiving a payment instrument. The registration, in one example, requires no intervention from the buyer and is automatically initiated when a payment is initiated through a payment object, such as a payment card, or an NFC-based payment object. The card reader, through a radio transmitter/receiver, detects the presence of a number of devices in proximity to the card reader.

To register a device as a payment authentication instrument, the card reader obtains device characteristics from all devices, or in some cases, only the device that is closest to the card reader, and computes a digital signature, for example, for the buyer's device and as a result, the buyer. To this end, the payment object reader explores how it can establish communication links with the device and in what ways. Accordingly, the payment object reader customizes detection sequences and payload meant to query the device in a number of ways. The payment object reader sends the detection sequences and payload to the buyer's device through the communication ports that are available to it. The payload and detection sequences are also designed to obtain various kinds of hardware and software information, such as transmission measurements for example, among other things a measurement of the phase error, of the frequency error, of the power and of the spectrum, RSSI, RSSI vs. frequency measurements. In reception measurements, bit error rates may be measured. In another example, the measurements correspond receiver diversity performance. In yet another example, the measurements relate to the mechanical defect of anomalies of embedded components, or engineering tolerances, timing parameters, and radio signal inaccuracies.

Various components in the buyer devices have features within a given tolerance or threshold. By threshold, the similar phone has to be within the following specifications, for example, within power dissipation. The values are selected based on weighing of each feature from a weight plane diagram. The more critical a feature, the smaller tolerance is assigned. While such devices may be similar in shape and form, as per the device fingerprinting applied here, such devices do not qualify as a similar and are indicated as such through the measurements.

At this time, the card reader may also request for financial information from the buyer. The buyer either manually enters the card details, swipes the card, or scans the card using a scanner therein. The card reader uploads the card information and connects the fingerprint with the card information, e.g., in a look-up table locally accessible via the card reader. This process registers the buyer's device fingerprints as a valid payment authentication instrument at that merchant location. The next time buyer purchases a product or service at the merchant's location using the card reader, the buyer can use the registered device since the device and card relationship is already established in the look-up table.

Instead of locally storing the device fingerprints, the card reader can store the registered device information on a server accessible via local area network, or even to a remote server to allow merchants from various locations to access the authentication instruments.

At the time of detection, the card reader can detect another phone based on stored fingerprints, such as the manufacturing tolerance range of the phone, which is a value unique to that phone. In another example, the card reader can detect another device based on its radiated performance. In some cases, the card reader detects a cluster or a combination of devices instead of a single device.

As described above, the disclosed technology enables the checkout process to be completed in a shorter amount of time with or without using a single user-initiated verification action. The friction-less purchasing technology reduces the overall interaction time and payment flow to less than 10 seconds by removing the need to entering authentication code every single time. Furthermore, the device fingerprinting enables detection of the computing device within a certain distance from the POS terminal, allowing the user to authorize the transactions with a single tap or click.

The devices can be registered as one or more authentication or authorization instruments in lieu of a conventional means of authorization, such as PIN number or any other code that can be duplicated by fraudulent means. Thus, on receiving the authentication from the computing devices, a payment processing system can authenticate payment transactions using the registered computing devices at any merchant location. In some implementations, the buyer need not provide any identification or use any personal device at the time of payment. As long as the buyer is in possession of a device associated with the payment instrument at a merchant location, the buyer can walk out with a product or service.

While the description hereinafter discusses authentication instruments with engineering tolerances as an example device characteristic, it will be understood that any other instrument that uniquely identifies the buyer's device may be registered. Further, the device fingerprinting as described herein can be used for card authentication, targeted advertising, delivering rewards and coupons, establishing preorders, facilitating delivery of orders, and the like. The unique device, when registered, enables the buyer to pay for a product or service without serving physical accessories, like a passport or driver's license, to prove their identity. Owing to the unique and personalized nature of the buyer device, payment transactions are less vulnerable to frauds. The use of buyer devices in conjunction with payment instruments makes it virtually impossible to feign or replicate the combination Further, the payment process leveraging the registered device characteristics is friction-less, easier, more efficient, and more convenient especially when compared to traditional methods of payment that require confirmation of identify or entry of PIN. Further, according to the present subject matter, it is possible the methods and systems to authenticate payment transaction by confirming presence of not just one, but a cluster of devices in proximity to the payment instrument. So, the payment transaction is authenticated when both a wearable watch and mobile phone, previously registered to represent the buyer, are present. If the wearable watch or the mobile phone is missing, the transaction maybe denied. This clustering leads to a more robust design of authentication.

While the embodiments described herein may relate to brick-and-mortar retails stores using POS terminals, including self-checkout terminals, it will be understood that the embodiments can be extended to shopping at any e-commerce location, including online shopping via merchant websites or applications.

Various embodiments and implementations of the disclosed purchasing technology are now described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

As used herein, a merchant may include any business engaged in the offering of goods or services for acquisition by buyers. Actions attributed to a merchant may include actions performed by owners, employees, or other agents of the merchant and thus no distinction is made herein unless specifically discussed. In addition, as used herein, a buyer may include any entity that acquires goods or services from a merchant, such as by purchasing, renting, leasing, borrowing, licensing, or the like. Hereinafter, goods and/or services offered by merchants may be referred to as items. Thus, a merchant and a buyer may interact with each other to conduct a transaction in which the buyer acquires an item from a merchant, and in return, the buyer provides payment to the merchant, for example through a biometric payment instrument.

As used herein, a 'payment transaction' or simply 'transaction' may include a financial transaction for the acquisition of goods and/or services that is conducted between a buyer and a merchant. For example, when paying for a transaction, the buyer can provide the amount that is due to the merchant using a payment proxy. In other cases, the payment transaction includes transfer of money from one party to another for any number of reasons. Thus, while the description refers to as buyer and merchant as parties to the payment transaction, it will be understood that the parties can be a sender and a recipient, a land lord and a renter, a bank and a bank customer, a first friend and a second friend, and so on.

The term 'payment card' or 'payment object' refers to a payment mechanism that includes a conventional debit card, a conventional credit card, a prepaid gift card, or the like, a smartcard that has an embedded integrate circuit chip (e.g., Europay-MasterCard-visa (EMV) card), a proxy card, or any card that functions as a combination of any of these mechanisms. The term 'proxy card' as used herein refers to a card that may or may not bear a card number or an account number that appears to be that of a real credit or debit card account (i.e., it is in the correct format), but where that card/account number is actually only a proxy for the buyer's real card/account number. Additionally, the payment card used in the example above is a specific type of a financial instrument. Other types of financial instruments, other than the payment card, can be used to initiate the transfer of funds. A financial instrument can be a software instrument or virtual instrument, such as a virtual wallet. Other examples of payment card may also include a prepaid card, a gift card, a rewards card, a loyalty points' card, a frequent flyer miles card, a check, cash, or any other kind of payment instrument that holds financial value or provides a promise to pay at a later time. Payment card may also include a payment object, such as an electronic device configured to initiate contactless payment transactions, e.g., a key fob, a mobile device (such as a mobile device having an NFC tag). And finally, the payment object can also be a payment proxy having a syntax of a monetary indicator followed by a string of alphanumeric characters or in general, any identifier that is representative of the buyer or merchant's financial account. The payment proxy can be used in the context of and within a webpage as part of the web address, a social networking handle or username, a forum, a messaging application, and so on.

The term 'biometric payment instrument' is a type of payment object or financial instrument that is biometrically identifiable and initialized by a biometric characteristic, such as a person's finger (e.g., for fingerprint recognition), face, iris or retina, heartbeat, voice, etc.

The term "landing page," as used here, refers to a virtual location identified by a personalized location address that is dedicated to collect payments on behalf of a recipient associated with the personalized location address. The personalized location address can include the payment proxy discussed above. In some embodiments, the landing page is identified by a uniform resource locator (URL) that includes a payment proxy, where the URL is accessible through a web browser application installed on a client device of the sender. For example, the URL is www..... com/$charityName. In another example, the URL is www..... com/$aaron. In some embodiments, the landing page is identified by a graphical user interface (GUI) of a mobile payment application installed on a client device of the sender. For example, the GUI of the mobile payment application is dedicated to $charityName, where there can be multiple GUIs each dedicated to a different payment proxy.

The landing page is generated by the payment service system to receive, e.g., collect, one or more payments on behalf of the recipient from one or more senders. The sender can access the landing page, e.g., by entering a URL into a web browsing application installed on the sender's client device. Upon navigating to the URL, the sender can simply enter a payment amount, e.g., in a web form field, and send the money, e.g., by selecting a "Pay" action button displayed on the website. In another example, the sender can access the landing page, e.g., by selecting a GUI within a mobile payment service application, where the GUI, e.g., is labeled with the payment proxy $aaron. The sender can further enter a payment amount at the GUI and send the money, e.g., by selecting a "Pay" action button displayed on the GUI.

The term "forum," as used here, refers to a media channel (e.g., a social networking website, a microblog, a blog, etc.) that enables user interaction and engagement through comments, posts, and/or messages. The forum can be employed by a service provider to provide various services to users of the forum, e.g., create messages, post comments, interact with one another, etc. Within a forum context, a user can indicate an intent to transfer money by specifying a payment proxy in a message that the user submits, e.g., "posts," on a particular forum, where that payment proxy carries the syntax of the monetary indicator preceding one or more alphanumeric characters. For example, the user posts a message "I support $funnyguy311 with $10." In such an example, the payment service system detects the user's intent to send money, e.g., $10, to "$funnyguy311" and initiates the transfer of money upon identification of a recipient financial account associated with "$funnyguy311." The monetary indicator can correspond to various currencies, e.g., dollar ($), euro (€), pound (£), yuan (¥), etc. Although use of the dollar monetary indicator ($) is used herein, it is to be understood that any currency symbol could equally be used.

The term "registration application" or "mobile payment portal" as used here, refers to any messaging application that enables communication between users (e.g., sender and recipient of a message) over a wired or wireless communications network. A service provider that delivers a communication service to users, e.g., chat capability, can employ the messaging application. The messaging application can include, for example, a text messaging application for communication between phones (e.g., conventional mobile telephones or smartphones), or a cross-platform instant messaging application for smartphones and phones that use the Internet for communication. Within a messaging application context, a user can indicate an intent to transfer money by specifying a payment proxy in a TO field of, e.g., a message, that the user inputs within the messaging application. For example, the user enters into the TO field "$redcross." In another example, the user enters into the TO field "$aaron." Once the user enters a payment proxy, or input, into the TO field, the user can enter a message in a body of the message, e.g., "Here is $10," and send the message. In various embodiments, the message can be a text message, a chat message, an email message, or indeed any other type of message that is capable of being exchanged between computing devices. Although this specification may employ text messages as an example, it is to be understood that the payment proxy technology may employ any of these types of messages. Upon receiving an indication to send (e.g., after detecting that the user has clicked "Send"), the messaging application transmits a message, e.g., the text message to a messaging application computer system ("messaging application system"). The messaging application system detects that the input in the TO field of the message it has received includes a syntax of a monetary indicator preceding one or more alphanumeric characters. In response, the messaging application system forwards the text message to the payment service system for processing. The payment service system identifies a recipient associated with the input (or payment proxy) that is derived from the TO field, and further identifies a recipient financial account associated with that recipient. Upon identification of the recipient financial account, the payment service system initiates the transfer of money.

It is noted that the payment proxy technology is equally applicable in other embodiments to various other content providers and various other types of providers, such as financial service providers or to any application that involves communication of messages between users, and that the payment proxy technology is not limited to media channels and/or messaging applications.

The preceding summary is provided for the purposes of summarizing some exemplary embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

Turning now to the Figures, FIG. 1 is a network environment 100 illustrating interaction between a point-of-sale (POS) system 101, comprising of a POS terminal 104 and a payment object reader 110, and a mobile device 108-1, and 108-2 both associated with a buyer 102A and a device 108-3 associated with a buyer 102B, according to an embodiment of the present subject matter.

In one example, the each of the devices 108-1, 108-2 or 108-3 is a handheld device such as a mobile phone, laptop, tablet computer, and the like, associated with a buyer making the purchase. In another example, the computing device 108 is a mobile device that is wearable or otherwise connected to or associated with the buyer, for example, the computing device may be an Apple® watch or a Fitbit®. The mobile device has device characteristics that can be characterized by engineering tolerances, hardware imperfections inherent to analog components of the device, radio frequency response to certain signals, which make it unique with respect to another seemingly similar device. Such device characteristics can be used for device identification or fingerprinting, and are in some ways manifestation of an individual's identity and can therefore be used verification and authorization of a method of payment that requests a buyer to confirm his or her identity.

In an example scenario, a buyer 102A approaches the POS terminal 104 being manned by a merchant 103, to pay for a product or service in a dedicated checkout area within a merchant store 106. The POS terminal 104 can be an electronic cash register that is connected to a payment object reader 110 capable of accepting a variety of payment instruments, such as credit cards, debit card, gift cards, near-field communication (NFC) based payment instruments, and the like. The POS terminal 104 can be connected to a central processing server, hereinafter referred to as the payment processing system (PPS) 114, to obtain inventory of available products and services. The POS terminal 104 can work in both online and offline modes to allow the merchant 103 to both access the inventory and provisionally process payments whether or not the communication network between the PPS 114 is established or not.

The merchant 103 (in case of a manned store) or the buyer 102 (e.g., in a self-checkout aisle) selects at least one product from the inventory displayed on a display 112 of the POS terminal 104 and moves on to a "check-out" page to finalize the purchase transaction. At this stage, the buyer 102 may provide a payment object 116, such as a payment card or instrument (e.g., debit, credit, prepaid, checks, etc.), cash (or its equivalent), securities, biometric payment instrument (based on any kind of biometric characteristic, e.g., finger- prints, voice print, speech patters, facial geometry, facial image, genetic signature, retinal iris scan, etc.), virtual currency, rewards, points, miles, etc., and/or other payment options, into a payment object reader 110 to pay for the items purchased.

The payment object reader 110 may be a magnetic stripe card reader, optical scanner, smartcard (card with an embedded IC chip) reader (e.g., an EMV-compliant card reader or NFC enabled reader), radio frequency identification (RFID) reader, or the like, configured to detect and obtain data off any payment object. Accordingly, the payment object reader 110 may include hardware implementation, such as slots, magnetic tracks, and rails with one or more sensors or electrical contacts to facilitate detection and acceptance of a payment object. Additionally or optionally, the payment object reader 110 may also include a biometric sensor to receive and process biometric characteristics and process them as payment instruments, given that such biometric characteristics are registered with the payment processing system 114 and connected to a financial account.

Going back to the method of payment, the buyer 102A pays for the transaction with a payment object 116. For this, the merchant 103 or the buyer 102A swipes the buyer's payment object through the payment object reader 110. The payment object reader 110 extracts relevant payment transaction data, i.e., information required for processing payment transactions, including, but not limited to, debit account information, credit cardholders name, credit card number, expiration date and card verification value (CVV), digital permanent account number (PAN), etc. The term "swipe" here refers to any manner of triggering the payment object reader 110 to read data from a payment object, such as by dipping into, tapping, bringing in close contact or passing a card into or through the payment object reader 110, such as a magnetic stripe card reader, optical scanner, smartcard (card with an embedded IC chip) reader (e.g., an EMV-compliant card reader or NFC enabled reader), radio frequency identification (RFID) reader, Bluetooth-enabled reader, or the like. The buyer 102A can utilize biometric characteristics, such as a fingerprint image, to replace a traditional payment object and unlock access to an electronic wallet containing the buyer's different payment preferences, payment modalities or a single account with financial information therein. The biometric characteristic can be linked to credit and debit card accounts and also checking and savings account, thus reducing the back-end processing fee for the merchant.

As addressed in the present disclosure, in one scenario, the buyer 102A is asked to validate or authenticate the method of payment by providing a passcode, PIN or some other kind of identification to prove that the buyer 102A who is in possession of the payment object is in fact authorized to make purchases with that object. Generally, passcode based authentication mechanisms may be easy to emulate by fraudsters to impersonate the buyer and get past the authentication hurdle. To this end, the methods and systems described herein disclose the payment object reader 110 which assumes that a particular transaction is authenticated if the buyer 102A involved in the transaction is in possession of a recognized device. The following sections describe how the methods and systems may make such detection.

In one implementation, the payment object reader 110 includes device detection components (not shown) including, but not limited to, sensors, detectors, radio frequency transmitters and/or receivers. By leveraging the sensing capabilities of these components, the payment object reader 110 scans and receives information from devices 108-1, 108-2 and 108-3 (referred to as computing device(s) 108) surrounding the payment object reader 110. As shown, some devices may be outside the actual store but within the geo-fence established by the merchant 103. In another implementation, the payment object reader 110 receives information from all computing devices 108 irrespective of their distance from the payment object reader 110. In another implementation, the payment object reader 110 may query or target a specific reader, for example device(s) 108-1 and 108-2 within a geographical or logical fence or having a specific IMEI or MAC address, etc.

In one implementation, the payment object reader 110 extracts information related to the computing devices 108 with or without an explicit authorization from the device 108 to share or exchange information through wired or wireless pairing or other such mechanisms. In some cases, multiple devices 108 may be connected to a single user, and the payment object reader 110 detects all devices or a combination of devices 110 to determine identity of the buyer and as a result, the authenticity of a payment object user.

By detecting the buyer's device and confirming that the buyer's device belongs to the right buyer or the registered buyer, the conventional steps of authentication are skipped. To this end, the payment object reader 110 first registers the buyer's device and its characteristics during a first transaction or through a registration application. The buyer can set up rules to allow the device to be used as an authentication tools only in certain scenarios. In all other scenarios, the buyer enters an authentication code to validate a payment transaction. The steps of registering a buyer device and then detecting it in subsequent transactions are discussed hereinafter.

The present subject matter leverages on the fact that each device is different from another owing to subtle differences introduced, rather inadvertently, in the devices during design and manufacturing phases.

The different designs of wireless devices may also result in different performance characteristics for each device. These characteristics are generally too subtle or negligible to be observable by a naked eye or be distinguished by a generic computer. For example, various design characteristics may impact the quality of the speech and data services provided by a mobile device and its ability to provide communications in varying radio environments, like the radio front-end of the mobile device, which drives, in part, the radiated performance (a devices ability to receive and transmit radio signals) of the device may positively or negatively impact the quality of communications in various radio environments. Another factor may be the device's capability to cancel interfering radio signals from wanted radio signals in order to reduce the signal-to-noise ratio and thereby improve the quality of communications. Other design factors include (a) the performance of the device's digital signal processor, (b) the design of the device's operating system and associated applications including the handling of TCP/IP communication. As a result, the different devices 108 may have varying performance characteristics due to their design. In other words, devices 108 operating in the same radio environment may provide different qualities of communication.

As suggested previously, wireless devices like devices 108 and the payment object reader 110 utilize radio waves to support communication over distance. The device 108 transmits and receives information via the radio waves, which may be carried over predetermined frequency bands. An antenna connected to a transmitter and a receiver, along with the associated circuitry, allows the wireless device 108 to transmit and receive these radio wave signals. The design of the wireless device 108, including the antenna and the various transmit- and receiver-related components, impacts the ability of the wireless device 108 to transmit and receive radio wave signals, and hence defines and affects the radiated performance of the device, which as mentioned in the previous paragraph can be measured to differentiate one device from another. Some of the methods are described hereinafter.

In one implementation, the payment object reader 110 extracts or reads specific characteristics, e.g. physical, radio, magnetic, wireless, and the like, from the device 108. For example, the payment object reader 110 obtains radio fingerprints of the devices 108 by allowing its radio frequency transmitter and receiver to interact with the respective antenna transmitter and receiver of the devices 108, for example on a specific or selected frequency bands. It is assumed that the devices 108 are operating over a wide range of radio frequencies and output power levels. The cellular telephone devices, which are now common, for example, operate in the 800-900 MHz or 1700-1900 MHz range and at power levels of about 600 mW while blue tooth devices operate in the 2.4 GHz range at significantly lower power levels. The payment object reader 110 may send signals to the devices 108 on the frequency and at the power levels understood by devices 108, where the responses to the signals from the devices 108 help identify the devices 108 to a reasonable accuracy. The signals are within Specific Absorption Rate (SAR) limitations. In some implementations, the payment object reader 110 obtains radio fingerprints in the form of transmission and reception measurements of the devices 108. The transceiver of the payment object reader 110 may obtain transmission measurements for example, among other things a measurement of the phase error, of the frequency error, of the power and of the spectrum, RSSI, RSSI vs. frequency measurements. In reception measurements, bit error rates may be measured. In one implementation, the payment object reader 110 may include additional components, e.g., antenna elements, diplexers, antenna coupler, and the like, to facilitate or obtain more accurate measurements.

In another example, the radio fingerprints correspond to radiated performance characteristics, such as Effective Isotropic Radiated Power ("EIRP"), receiver sensitivity, Total Radiated Power ("TRP"), Total Isotropic Sensitivity ("TIS"), and envelope correlation, which is related to receiver diversity performance. These characteristics are also unique to a device given their design differences, given that all other signal propagation factors, such as propagation paths, physical environment, and the like remaining same. This is because in a wireless communication system, an RF modulated signal from a transmitter may reach a receiver via a number of propagation paths. The characteristics of the propagation paths typically vary over time due to a number of factors such as fading and multipath. Further, structures such as buildings, and surrounding terrain, including walls, contribute to the scattering and reflection of the transmitted signal. The scattering and reflection of the transmit signal results in multiple signal paths from the transmitter to the receiver. The contributors to the multiple signal paths change as the receiver moves. Other signal sources also contribute to the degradation of the desired signal. The other signal sources may be other transmitters intentionally operating on the same frequency as the desired signal, as well as transmitters that generate spurious signals in the frequency band of the desired signal. Yet another source of signal degradation may be generated within the receiver itself.

Signal amplifiers and signal processing stages within the receiver may degrade the level of the desired signal with respect to the level of thermal noise. The signal amplifiers and processors within the receiver may also generate noise products or distort the received signal and further degrade its quality. The calculated value of the radiated performance characteristics, based on measurements described herein, may then be stored for future detection of the wireless device. At a future time, the radiated performance characteristics are compared to the stored values, in order to determine a radiated performance approval and/or certification of the wireless device.

Both during the detection and registration of the wireless device 108, the wireless device 108 may be placed in an anechoic chamber to provide RF isolation from the external environment and allow for the execution of detection of the devices 108 on the same frequency channels as used during the time of device registration.

Besides or in addition to radio fingerprints mentioned above, the payment object reader 110 obtains fingerprints of the devices 108 through the wireless transmitter and receiver and over Wi-Fi or Bluetooth communication protocols. In one implementation, the transmitter obtains the fingerprints from the devices 108 by transmitting and receiving command and control parameters to and from the devices 108. The command and control parameters place the wireless device in a detect mode and determine the quality and operations of a radio frequency (RF) link established between the wireless device and the base station. The wireless data communications link is also used to transmit command and control parameters from the wireless device to the base station. The quality of the RF link is stored in a database as wireless fingerprint of the device. At a future instance, the device 108 can be detected by re-establishing an RF link and determining the quality to be similar to one of the stored values, where each value corresponds to a unique device. In some implementations, the uplink and/or downlink data speed through the RF link may be used as parameters to detect a device 108 from amongst other devices.

In another implementation, the payment object reader 110 measures the manufacturing or engineering tolerances of the sub-components embedded in the devices 108. For example, the payment object reader 110 can measure the performance of microphone, accelerometer or other such sensors. In another example, the payment object reader 110 can measure the defects or anomalies in a particular device that are unique to the device.

In another implementation, the payment object reader 110 is configured to detect any open communication ports in the neighboring device and generate, on-the-fly for example, schemes to communicate detection sequences to the neighboring devices 108. The schemes are configured based on a communication protocol corresponding to the open port.

The payment object reader 110 sends a request to the buyer device 108 to open some communication ports to allow access of the devices 108. The payment object reader 110 also sends requests to allow the payment object reader 110 to make the measurements. Not just that, the payment object reader 110 requests whether it can store such information for future use. Furthermore, the payment object reader 110 requests the buyer to decide whether they would prefer the measurements to be stored locally or remotely. In other cases, the payment object reader 110 or even the merchant may make that determination either on the basis of the merchant location or on a transaction-to-transaction basis.

After obtaining the device fingerprints such as information related to the radiated performance, defects, manufacturing or engineering tolerances, etc., the payment object reader 110 stores the fingerprint data for future use such as detection, based for example of the buyer or merchant's direction. The payment object reader 110 may store such data locally within the reader or in a connected device, such as a POS terminal, or remotely in a server, such as a payment processing system. The payment object reader 110 also facilitates storage of the device information and maps the device information to the payment object that was presented at the time of transaction so as to create a relationship between the payment object and the specific device present at the time of transaction. Such relationships may be saved in various formats, such as charts, semantic maps, taxonomies, trees, and the like, and are hereinafter referred to device-object relationships.

When the buyer, whose device fingerprints are stored in a local or remote database, approaches a store with a payment object, such as a credit card, the payment object reader 110 first detects whether there are any wireless devices in the range of the reader 110. Then the reader 110 determines whether any of the neighboring devices is related to a stored device as per the device-object relationships. For this, the payment object reader 110 measures the radiated performance, defects, manufacturing or engineering tolerances of the neighboring devices and compares it to the stored fingerprints. If the payment object reader 110 identifies a device-object relationship and matches it to the current device-object pair as presented by the buyer, the payment object reader 110 treats it as a payment authorization instead of the conventional means of PIN or buyer-initiated authorization. This is particularly helpful in cases where the buyer wishes to maintain anonymity to prevent personal information of the buyer 102 from being collected by the merchant 103. As another example, the buyer 102 may be wary of the buyer's card data being misused to conduct fraudulent transactions. In another scenario, the buyer 102 may not be carrying a physical means of payment to furnish payment at the merchant's location.

In some implementations, the POS terminal 104 separately detects the wireless devices in a manner explained above. The POS terminal 104 can use same detection sequences and ports to detect devices in its proximity. The device fingerprint obtained by the POS terminal 104 is also saved and compared with the device fingerprint obtained by the payment object reader 110. This kind of triangulation of data from both the payment object reader 110 and the POS terminal 104 to corroborate the identity of the buyer's devices. In some cases, the POS terminal 104 and the payment object reader 110 use separate communication channels for both detection and validation of the buyer device. In other cases, POS terminal 104 and the payment object reader 110 use different communication channels to both communicate with each other and with the buyer devices. According to related aspects of the present subject matter, triangulation of data may be by "direct" triangulation, e.g., as where the identity of the buyer device is determined from the point of intersection (or the point of least squares fit) of multiple device fingerprints (from multiple fingerprints corresponding to detection sequences). Alternatively, or in addition, triangulation may be "indirect," as where the identity of the buyer device is determined not only from the device fingerprints, but also from relative fingerprints originating from other devices in the proximity or historical purchases.

On receiving authorization or contemporaneous to the authorization step, the POS terminal 104 or the payment processing system 114 on behalf of the merchant, generates a fund transfer request for the amount of product or service requested by the merchant 103 and sends to a computer system 114 of a payment processing service (referred to as "payment processing system" or "PPS 114") via a communications network 118. The PPS 114 can be a cloud computing environment, a virtualized computing environment, a computer cluster, or any combination thereof. The PPS 114 can analyze the fund transfer request based on a plurality of rules stored in a knowledge database (not shown) before sending the fund transfer request to a computer system 120 of the PPS' acquirer or merchant's acquirer (hereinafter "acquirer 120"). For example, one of the rules in the knowledge base may be determining whether the request is in a certain format or whether the request when run against a risk machine yields a safe score, or that the request was authorized based on device fingerprinting as authentication. In one implementation, the acquirer 120 is a bank or financial institution that processes payments (e.g., credit or debit card payments) and may assume risk on behalf of a merchant 103 or a plurality of merchants 103 aggregated by and represented under PPS 114. The acquirer 120 sends the fund transfer request to the computer system 122 of a card payment network (e.g., Visa, MasterCard, Discover or American Express) (hereinafter "card payment network 122") to determine whether the transaction is authorized or deficient in any other way. In some implementations, PPS 114 may serve as an acquirer and connect directly with the card payment network 122. The card payment network 122 forwards the data to the computer system of an issuing bank 124. The issuer 124 is a bank or financial institution that offered a financial account (e.g., credit or debit card account) to the buyer 102A or 102B. The issuer makes a determination as to whether the buyer's payment information is valid and whether the buyer 102A has the capacity to absorb the relevant charge associated with the payment transaction.

Each of the aforementioned computer systems can include one or more distinct physical computers and/or other processing devices which, in the case of multiple devices, can be connected to each other through one or more wired and/or wireless networks. All of the aforementioned devices are coupled to each other through the communications network 118, including the Internet, intranet, a cellular network, a local area network, a wide area network, or any other such network, or combination thereof. Protocols and components for communicating over such a network are well known and are not discussed herein. Furthermore, PPS 114, the POS terminal 104, and the mobile device 108 can also communicate over the communications network 118 using wired or wireless connections, and combinations thereof. If the payment transaction is approved by the issuer 124 and/or the card payment network 122, a payment authorization message is communicated from the issuer to the merchant computing device 104 via a path opposite of that described above.

While the description above may be described with reference to a single device being mapped to a single object, it will be understood that various variations are within the realm of this methodology. For example, multiple devices can be registered with a single payment object or multiple payment objects in a manner described in the foregoing paragraphs. In such implementations, the authorization of a payment transaction in response to an introduction of a payment object may be based on the detection of a specific device or a collection of devices. Alternatively, the authorization may be based on the detection of a specific cluster of devices, in a specific order or location. In another scenario, the authorization may be based on detection of a specific object with a specific device amongst the cluster of devices, where the absence of another device indicates a more formal means of authorization. So, a buyer may be asked to key in a PIN or password shown on the first or a third device, either through a text or email notification, to authorize the payment transaction.

FIG. 2 is an exemplary system 200 illustrating systems and methods to register a device 202-1, 202-2 or 204-1 with a payment object 208 being introduced in a payment object reader 206 to fulfill a payment transaction, and to detect the registered device in a subsequent transaction either at the same or a different merchant location, according to an implementation of the present subject matter.

In one implementation, the payment object reader 206 includes one or more components configured specifically to allow the buyer to detect a device and its device characteristics as payment authentication tools, for example, a display 210, a database 212, a network interface 214, a transmitter-receiver 216, an antenna 218, a sensor 220, a power meter 222, and a spectrum analyzer 224. As shown, the payment object reader 206 also includes a signal conditioning and monitoring component 226, a device detection component 228, a communication protocol interface layer 230, and payload or detection sequences 232. In one implementation, these components can be part of a POS terminal, such as POS terminal 104, connected to the payment object reader 206. The devices 202-1, 202-2 and 204-1 may each include a registration application 234, antenna 236, and transmitter-receiver 238 and device characteristics 239, besides other components (labeled only in device 202-1 for clarity). Examples of device characteristics include but are not limited to: timing parameters, radiated performance, wireless performance, quality of communication links, radio frequency response, transmission measurements, receiver measurements, and engineering tolerances.

The communication ports 240 shown can be either hardware or software implementations. In the scenarios explained here, devices 202-1 and 202-2 are associated with the buyer 202 and the device 204-1 is associated with device 204. These components are described in detail in FIG. 7.

In one implementation, the device detection component 228 is configured to detect devices through physical device characteristics 239, such as mechanical and operational differences, associated with a device accompanying a buyer. The communication protocol interface layer 230 includes various communication protocol interfaces available to the payment object reader 206 with which it can interact with other wireless devices, e.g., buyer associated devices 202-1, 202-2, and 204-1. The device detection component 228 is also configured to generate a profile or a signature 225 of the communication device in response to a received device characteristic, and register the device with a payment processor, such as payment processing system (not shown) for detection during a future use. The signature 225 also includes the mapping of the device characteristic with a payment object belonging to the buyer and is sent to the PPS coupled to the payment object reader. Device identification processes can also be accomplished locally in isolation at the payment object reader level without interaction or communication with external devices (e.g., RFID tag readers and POS devices or other wireless network access points). This isolation reduces the risk of electronic pick pocketing of device information that can occur when payment devices are continually in wireless communication with external devices.

To use a device or devices belonging to a buyer 202, e.g., devices 202-1 and 202-2, or device 204-1 for buyer 204, as tools for authorizing a payment instrument, the payment object reader 206 first registers the devices as such, when a buyer performs a first transaction or makes an authorization to this effect.

Assume that both buyers 202 and 204 walk into a store at the same time or around the same time. Buyer 202, however, approaches the payment object reader 206 first to pay for an item. While the payment object reader 206 detects all devices within the merchant's geo-fence, devices 202-1 and 202-2 associated with the buyer 202 may be closer. The payment object reader 206 uses radio communication techniques or other location detection techniques (triangulation, for example) to measure, for example, signal strength from the devices within the geo-fence to determine which device is the closest. In other cases, the merchant identifies the device as closest based on physical information such as device name, etc.

The device-payment object relationship, also referred to as the profile or signature of the communication device, can be stored in a central payment processing system, such as PPS 242, or locally within, for example, a secure enclave system, such as database 220, in the payment object reader 206. The PPS 242 may include a comparator 244, the device fingerprint 246 as received from the payment object reader 206, and a registered fingerprints 248, which is a database of registered fingerprints from all known devices.

In one implementation, the payment object reader 206 sends a request to the neighboring devices, which are detected by a geographical or logical fence of the payment object reader 206, or to the closest device. So, the payment object reader 206 may send a request to all devices within the geo-fence or specific devices determined to be closest to the buyer 202. Assume that the payment object reader 206 sends requests to both the device 202-1 belonging to buyer 202, and device 204-1 belonging to buyer 204. For the sake of simplicity, the second device 202-2 of the buyer 202 is a wearable device, like a fitness tracker with limited functionalities, and connected to the main device 202-1, which is a mobile phone. The buyers 202 and 204 may receive these requests as email or text notifications, or a ping to the device invisible to the buyer.

Alternatively, the buyer 202 launches or opens a registration application or a mobile payment portal 234 (e.g., a payment application installed on the device or a web application in web browser) executing on a mobile device 202-1, e.g., a phone or a laptop, or the POS terminal (not shown) to initiate registration of the device 202-1 and any other devices that the buyer would like to register, for example device 202-2. The term "registration application" or "mobile payment portal" as used here, refers to any registration application that enables communication between users (e.g., sender and recipient of a message) over a wired or wireless communications network. The registration application 234 can be employed by a service provider that delivers a communication service to users, e.g., chat capability or capability to enter payment information, say through a form. The registration application 234 may include one or more components and/or engines, or a component and/or engine can include one or more applications. The registration application 234 can include, for example, a mobile payment application, a text messaging application for communication between phones (e.g., conventional mobile telephones or smartphones), or a cross-platform instant messaging application for smartphones and phones that use the Internet for communication.

The registration application 234 can also include, for example, a web browser application installed on a computing device 202-1 or 204-1 of the buyer 202 and 204 respectively, accessible via a uniform resource locator (URL). In some embodiments, the URL is identified by a graphical user interface (GUI) of a mobile payment application installed on the computing device 202-1 and 204-1.

The registration application 234 facilitates collection of and connection between the buyer's device characteristics 239 with the financial account information of the buyer. For example, the registration application 234 requests the buyer 202 to confirm whether the payment object inserted or being introduced in the card reader belongs to them and enter a card verification value (CVV) code for further confirmation. This step may be performed only at the time of registration. Once confirmation is received, the payment object reader 206 executes a control logic to determine which techniques, protocols, parameters, test sequences, components, etc., should it implement to register the device.

At the time of both detection and validation of the device fingerprint for authentication, it may be useful to have data corresponding to all possible parameters, protocols and test sequences, however the device 202-1 may not be prepared or available for all kinds of communication. To communicate with the device 202-1, the device detection component 228 determines whether the corresponding communication ports in the device 202-1 are available or accessible and/or appropriate software permissions have been obtained to make the communication. To this end, the device detection component 226 through the communication protocol interface layer 230 determines which communication ports 240 of the device 202-1 are accessible, and accordingly its own ports to establish communication links with the available port. Alternatively, the reader 206 may send requests to activate certain ports 240 to allow seamless communication and further registration process. The buyer's device may respond with an automatic or user-initiated activation of the ports 240, e.g., by activating NFC, Wi-Fi, or Bluetooth communication.

Then the device detection component 228 establishes communication links with all or a selected number of available ports 240 using the appropriate communication protocol and the buyer may be notified when the reader 206 makes such connections. For example, the device detection component 228 queries the device 202-1 in response to a transaction activity for information related to manufacturing tolerances of the engineering sub-components of the device 202-1. Specifically, the reader 206 applies the device detection component 210 to measure the performance of the microphone, accelerometer, gyrometer, magnetometer, antenna transmitter and receiver, or any such sensor of the device 202-1. The device detection component 228 may also implement logic to interact with the hardware and software components of the device 202-1 to measure the tiniest subtleties or defects in the device 202-1 and record them as device fingerprints.

The device detection component 228 also activates the antenna 218 and receiver-transmitter 216, spectrum analyzer 224, sensor 220, and the like of the reader 206 to communicate with a corresponding antenna and transmitter-receiver of the device 202-1 through the radio communication protocol. The device detection component 228 detects parameters, either individually or in combination, rise-time signatures, spectral values, signal transients, hardware impairments, channel characteristics, power values, signal strength, identity of the received signals, say in terms of frequency or phase, timing parameters associated with the received signal, and the like, to obtain physical characteristics of the device 202-1 and store them as device fingerprints.

The device detection component 228 may also accompany request for information with specific sequences or payload 212, which it generates or modifies based on the available communication ports 240. The payload 232 may either be common between all devices being registered or unique for each device. The payload 212 can be a data signal or a series of instructions that trigger the device 202-1 or certain components, like the transmitter or sensors, to respond. The nature of responses from the device 202-1 or the content therein is said to be unique for each device and is saved as device fingerprints. The responses from the selected devices can also be in the form of affirmative or negative answers to queries from the payment object reader 206. The responses, whether binary or textual information, can be conditioned. The signal conditioning and monitoring component 226 performs such conditioning required to remove noise or to change data format, in select cases.

The device detection component 228 obtains the device fingerprints 246 and saves the values either locally or in a persistent remote location, such as PPS 242. The device detection component 228 also stores the relationship between the device fingerprints and the payment object presented at the time of transaction as device-object relationships, for example in registered device fingerprints 248. For this step, the buyer may be asked to enter an authorization code to confirm for the first time that the card in fact belongs to him. The reader 206 stores identifier of the payment object, such as the last four digits of the card. The device detection component 228 saves such relationships in a database 212 embedded in or associated with the reader 206. Additionally or alternatively, the device detection component 228 applies a cryptographic algorithm, for example encryption or tokenization, to the received relationships prior to storage.

This completes the registration of the device as an authentication tool for any subsequent payment transactions. By setting up the relationships, the reader 206 allows that every time a user presents the payment object, like a credit card, with the device 202-1, the transaction is authenticated as being safe. Conversely, if the user presents another object in the presence of the device 202-1, the user may be asked if they would like to try another card. In other cases, it may be determined if the new card is associated with a different device. If yes, the transaction may be rejected as a fraudulent attempt. In another scenario, the user may present the card but not have the registered device on him, in which case, he may have to authorize in the conventional manner.

Thus, once saved in the database 212, the registered device fingerprints or the device-object relationships can be retrieved and used as valid authentication tools for payment instruments at the time of a payment transaction, for example through the point of sale terminal. Now, the process of authorization using a registered device fingerprint is described. At the time of transaction, when the buyer 202, on arrival at the point of payment, wishes to use his device as a means of authorization of the payment object to purchase a product, the buyer 202 first makes such selections using the mobile payment portal. Then the buyer 202 presents the payment object that was present at the time of registration at the merchant's location where the payment object reader 206 is installed.

In some implementations, the device detection component 228 captures the device fingerprints, for example, at least one of the radio fingerprints, the manufacturing tolerances, and the like, in a manner similar to the process of registration. So, the device detection component 206 first seeks permission from the proximate devices 202-1 and 204-2 and determines available open ports.

Subsequently, device detection component 228 generates a payload, which may be similar to the payload used at the time of registration, and waits for a response from the devices 202-1 and 204-1. In this manner, the device detection component 206 captures a digital device fingerprint of the devices 202-1 and 204-1 present at the merchant location. The device detection component 228 can implement a tokenization technique, similar to the one used at the time of device registration, to generate another digital signature 225 or representation of the imprint in response to the captured device fingerprints and the payment object presented at the merchant's location.

In one implementation, the reader 206 sends the generated digital signature 225 to the payment processing system 242 via the communication network 250 for comparison with registered device fingerprints from devices 202-1 and 204-1. The device detection component 228 can also fetch the registered device fingerprints from a local storage unit, as the case may be. The device detection component 228 subsequently verifies buyer identity based on the comparison. For example, the payment processing system 242 compares previously stored buyer profiles or fingerprints of the devices registered by the buyer 202 and the digital signature 225 or profile obtained at the payment object reader 206 through the comparator 244. The generated fingerprints are compared with the fingerprints in the database and the fingerprint in the database that is closest to the generated fingerprint is selected as the match. The buyer profile includes an association of a previously obtained device characteristic with information identifying a previously received payment object. In one embodiment, the search algorithm takes more than one fingerprint from the database that are closest to the generated fingerprint and interpolates the most plausible device from the devices associated with the fingerprints. In one implementation, if the generated profile is substantially similar to the buyer profile, the payment processing system authorizes on account of confirming presence of the communication device, the payment transaction, where the authorizing further includes transfer of an amount of funds corresponding to the payment transaction from a financial account of the buyer to a financial account of the merchant.

So, if the digital signature 225 matches with a pre-registered and stored device-object relationship in database 116 associated with the payment processing system 242, which in this case is for device 202-1, the merchant 106 through the POS terminal, such as POS terminal 104, authorizes buyer's device fingerprint and the payment object as a legitimate means to make payment. If the digital signature 225 does not match, the payment object reader 206 generates a notification for the buyer 202 to try another means of payment or authorize through conventional means by providing an authorization code. Once authenticated, the payment transaction is fulfilled through the issuer, acquirer and card processing network, as described in FIG. 1.

In some cases, the payment object reader 206 establishes a number of communication channels between the payment object reader 206 and the buyer's devices to confirm the device fingerprint.

In yet other cases, the PPS or the POS terminal 104 establishes separate communication channels with the buyer devices. The POS terminal 104 then obtains the device characteristic corresponding to the detected buyer devices. Then the POS terminal generates a second profile or device signature of the buyer device based at least in part on the obtained device characteristic from the POS terminal and the received payment object. It then transmits the second profile of the communication device to a payment processing system communicatively coupled to the POS terminal, or directly to the reader. The PPS then corroborates whether the profile from the payment object reader is more accurate than the second profile from the POS terminal. Accordingly, in some implementations, of the second profile more accurately points to a device, PPS recalibrate the previously granted authorization.

Figure 3B:
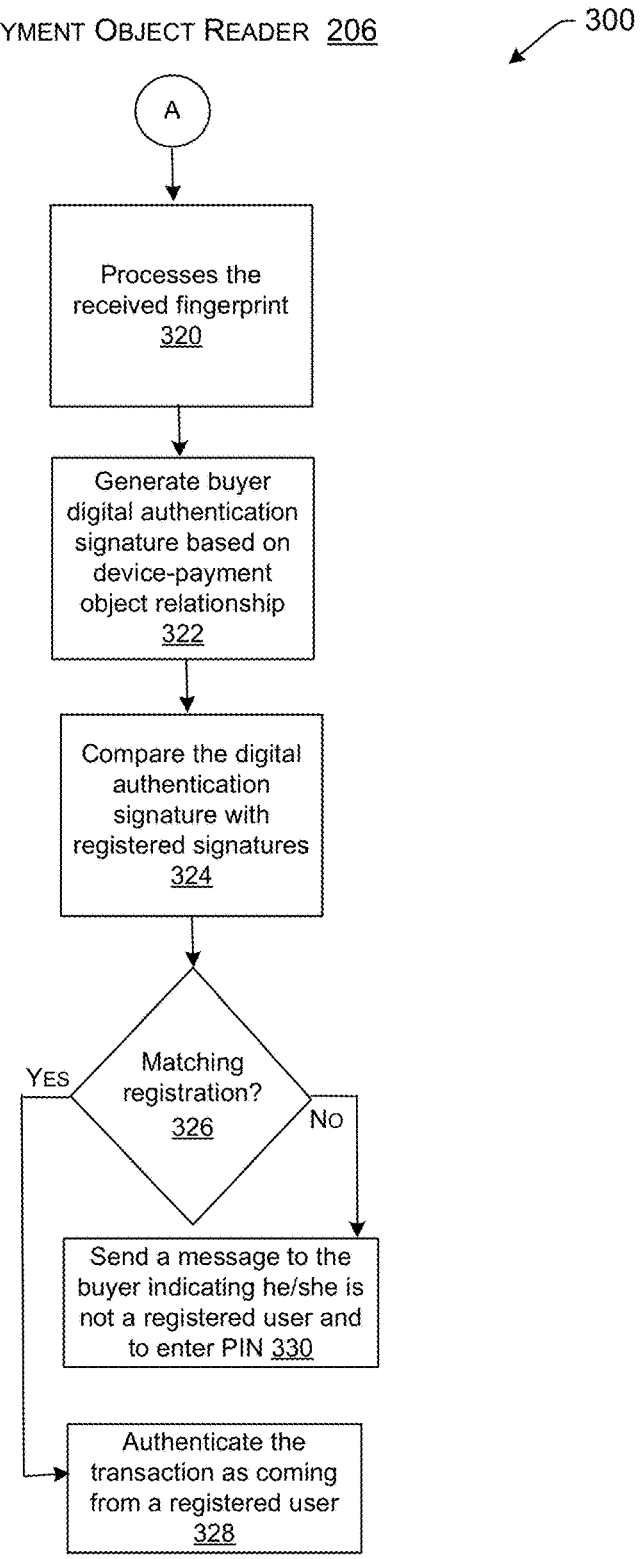

FIGS. 3A and 3B are sequence flows illustrating an example process 300 of a method of registering a buyer's device as an authorization instrument with a payment processing system, according to an embodiment of the present subject matter.

The process 300 can be performed by one or more components, devices, or modules such as, but not limited to, the mobile device, the payment processing system, merchant device or POS terminal, or payment beacon or other components or devices. For the sake of explanation, the description hereinafter is described with reference to components described in FIG. 2. As illustrated in FIG. 3, the process 300 includes a set of operations from block 302 to block 330. It will be understood that the method can be carried out by any component of the payment system, e.g., the POS terminal, PPS or both, for example contemporaneous to the payment object reader 206.

The process 300 starts with the operation at block 302. A buyer 202 with a buyer device 202-1 approaches a checkout area at a merchant location, which is equipped with a payment object reader 206 (step 302) and presents a method of payment, e.g., a payment object like a credit card or a biometric payment instrument, into the payment object reader 206, for example through a dip, swipe, tap or such action. This is also referred to as transaction activity. Other examples include: (a) a payment object being introduced in proximity to a payment system; (b) indication of someone accessing a payment account; (c) retrieving a transaction history; (d) approving authenticity of an action; and (e) detecting a payment transaction. Any kind of transaction activity can trigger the process of registration an/or detection described hereinafter (step 304) The payment object reader 206 may store the location coordinates of the buyer. The payment object reader 206 scans the payment object that was inserted or otherwise introduced in the payment object reader 206. For example, the payment object reader 206 scans the payment object information, e.g., the last four of the card data (step 306).

At this point, in one implementation, the payment object reader 206 can determine whether an authentication alternative is present, for example, by communicating with the payment processing system. Based on the payment card information, the payment processing system indicates whether a device has been registered corresponding to the payment object as a valid tool for authentication.

If not, the flow transitions to step 308 where the registration steps. If yes, that is if there is already a device registered, the flow transitions to checking whether any device in the neighborhood of the buyer, based on the location coordinates obtained at step 304, is the same as the device registered. In another implementation, the authentication alternative is checked after the devices around the buyer are scanned. This is further explained in the paragraphs below.

At step 308, after obtaining card information, the payment object reader 206 proceeds to detecting entry of the buyer device 202-1 through location detection techniques, such as techniques based on angulation, lateration, proximity detection, dead reckoning, geo-fence, global or local positioning systems, Bluetooth Technology, Near-Field Communication Technology, sensors-based technology, Radio frequency identification (RFID) system, or the like. In one embodiment, the present subject matter enables automatic geo-fence establishment and activation. According to the present subject matter, the geo-fence is defined and established based on a current location of an asset, for example using GPS data comprising latitude and longitude along with some predetermined area based on range or distance. In this manner, the user need not manually specify a location by drawing a perimeter, specifying a point location, or by any other means.

This step of detecting location of the devices with respect to the location of the payment object reader 206 may be performed contemporaneous to the step of scanning the payment object. Additionally, the payment object reader 206 can use buyer location to further zero in on the device that is most likely to be the buyer's (step 308).

The payment object reader 206 then determines how it can interact with the recognized buyer device or devices. The payment object reader 206 detects devices that are within a communication range dictated by a communication protocol, for example, wireless or RF protocol. Then the payment object reader 206 establishes communication channels with all or selected devices in its communication range. For this, the payment object reader 206 sends preliminary signals or data to explore communication ports in the device, which are available (step 310). Accordingly, the device detection component 228 of the payment object reader 206 generates payload and/or detection sequences adapted based on the available communication ports and in accordance with the communication protocols on which the ports operate (step 312). The detection sequences can be in the form of specific signals requesting the device to respond in a certain way. The detection sequences can also be information-gathering requests configured to obtain device fingerprints from the buyer devices. Device fingerprints include radio, mechanical or operational fingerprints—such as radiated performance, device defects, sensor performance, communication speed or lags, spectrum data, and the like.

The targeted buyer device receives the payload and detection sequences via the appropriate communication ports and protocols (step 314) and responds accordingly. For example, the detection sequences can be queries to which the device responds with a yes or a no. In another example, the detection sequences dictates how the payload can be sent to a particular component of the device, such as the sensors, to evaluate its performance. The detection sequences also include instructions to send the information back to the requestor, in this case the payment object reader 206. In some cases, the responses may be encoded at the buyer device level by appending randomly generated tokens to generate a digital authentication signature of the digital device fingerprint.

The buyer device can apply tokenized pseudo-random numbers (also referred to as hash keys) to the feature vectors to generate the device fingerprint. A National Institute of Standard and Technology (NIST) compliant True Random Number Generator (TRNG) can generate the pseudo-random numbers. The encoding can also be done based on keys generated by a cryptographic unit (not shown). Examples of keys include authentication keys, which include SCP03 master keys (Message Authentication Code Key: MAC, Encryption Key: ENC and Key Encryption Key: KEK, which are 256-bit Advanced Encryption Standard (AES) symmetric keys with associated key derivation data) or Key Agreement Keys (e.g., user server signature verification public key, user server static public key, user static key pair with both public and private key). The encrypted fingerprint can also be created using other schemes, such as fuzzy vault algorithm, a cancelable fuzzy vault scheme based on irreversible hash functions, such as hash functions, such as MD, RIPEMD, and SHA. (Step 316.)

The responses form the digital device fingerprints, which are to be used for device identification and authentication of a payment transaction at a later time, are then sent to the payment object reader, as shown in step 318. At step 320, shown in FIG. 3B, the payment object reader 206 processes the received fingerprint, e.g., performs signal modulation and conditioning. The reader (or a remoter server) also creates a buyer digital authentication signature 225 or device-payment object relationships including the obtained digital device fingerprints and data pertaining to the transaction, for example, the location and time of the transaction or buyer, or the card information. In one implementation, the payment object reader 206 further encrypts the received digital signature 225 and transmits the encrypted signature via a communication network, e.g., the USB/Wi-Fi connection (step 322), to a central server, such as the payment processing system 114, or keeps it local within an associated database. In one embodiment, the PPS 114 then compares the syntax and content of the buyer digital signature 225 with registered signatures to confirm whether or not buyer digital signature corresponds to a registered device (step 324). In another embodiment, the PPS 114 then transmits the buyer digital signature to one or more buyer mobile devices, such as those determined to be proximate to the POS terminal based on geo-fence data, to determine whether or not the buyer digital signature corresponds to a registered biometric payment instrument. In some implementations, the digital device fingerprint may be stored in the database if the digital device fingerprint does not exist in the database, wherein storing enables use of the communication device as an authentication instrument in subsequent payment transactions between the buyer and the merchant. Also, rejecting the payment transaction if the digital device fingerprint does not exist in the database.

If the match operation (step 326) as a result of the comparison at step 324 yields a "Yes," the flow transitions to step 328. First, the PPS 114 identifies the buyer as a registered user (e.g., after performing the comparison itself, or after receiving a confirmation from a buyer mobile device proximate to the POS terminal after the buyer mobile device performs the comparison, etc.). Then, the PPS 114 authorizes the payment transaction as approved since the device was previously registered (step 328).

If the match operation (step 326) as a result of the comparison at step 324 yields a "No," the flow transitions to step 330 where the buyer is sent a notification on his device or the buyer is asked to key in a card verification value or some other kind of authentication code into a field in the payment object reader's display message. The code is also saved in the device-object relationship and is retrieved every subsequent time the device alone is used as a means for authenticating a payment transaction. This is described in FIG. 4. This completes the registration of the device with the payment object or the merchant location. Every subsequent time, the customer makes a payment transaction, the entry of an authentication code is replaced by the payment object reader detecting and confirming the presence of a registered device, where the device detection based on the detection of device characteristics such as mechanical or operational performance parameters.

Figure 4A:
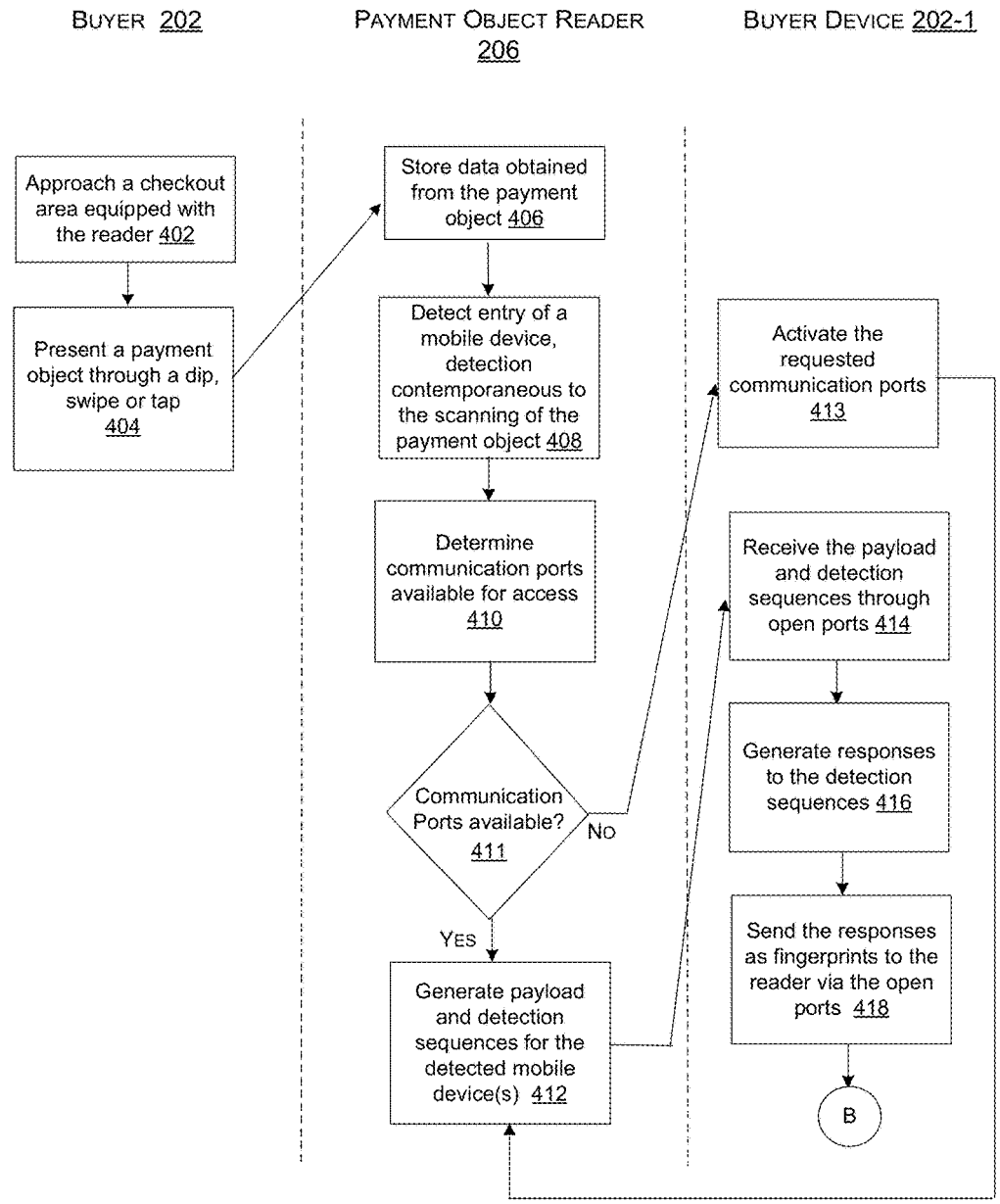

FIGS. 4A and 4B are sequence flow methods that depict detecting a registered device at the time of a payment transaction, according to an embodiment of the present subject matter. The process 400 can be performed by one or more components, devices, or modules such as, but not limited to, the mobile device, the payment processing system, merchant device or POS terminal, or payment beacon or other components or devices. For the sake of explanation, the description hereinafter is described with reference to components described in FIG. 2. As illustrated in FIG. 4, the process 400 includes a set of operations from block 402 to block 430.

The process 400 starts with the operation at block 402. A buyer 202 with a buyer device 202-1 approaches a checkout area at a merchant location, which is equipped with a payment object reader 206 (step 402) and presents a method of payment, e.g., a payment object like a credit card or a biometric payment instrument, into the payment object reader 206 (step 404) The payment object reader 206 may store the location coordinates of the buyer. The payment object reader 206 scans the payment object that was inserted or otherwise introduced in the payment object reader 206. For example, the payment object reader 206 scans the payment object information, e.g., the last four of the card data (step 406).

At this point, in one implementation, the payment object reader 206 can determine whether an authentication alternative is present, for example, by communicating with the payment processing system. Based on the payment card information, the payment processing system indicates whether a device has been registered corresponding to the payment object as a valid tool for authentication.

If not, the flow transitions to step 308 of FIG. 3 where the registration steps begin. If yes, i.e., if there is already a device registered, the flow transitions to checking whether any device in the neighborhood of the buyer, based on the location coordinates obtained at step 404, is the same as the device registered. This step would require all devices to be queried. In another implementation, the authentication alternative is checked after the device of the buyer is affirmed so only that specific device is queried. This is further explained in the paragraphs below.

At block 408, after obtaining card information, the payment object reader 206 proceeds to detecting entry of the buyer device 202-1 through location detection techniques, such as techniques based on triangulation, trilateration, multilaterations, geo-fence, global or local positioning systems, and the like. This step may be performed contemporaneous to the step of scanning the payment object. Additionally, the payment object reader 206 can use buyer location to further zero in on the device that is most likely to be the buyer's (step 408).

The payment object reader 206 then determines how it can interact with the recognized buyer device or devices. For this, the payment object reader 206 sends preliminary signals or data to explore communication ports in the device, which are available for access and communication (step 410). If there is even one communication port available, the flow control moves to step 412. In some cases, the payment object reader may detect a number of communication ports that are available or can be made available on request. In such cases, the merchant or the buyer selects a communication port. In other cases, the selection process can be automated such that ports that meet certain conditions are enabled or used. For example, power-saving or time-saving communication channels are set up.

If no ports are available for access, the flow transitions to step 411 where the buyer is asked to activate certain ports to allow communication. After activation, the flow either moves to 410 or 412.

At block 412, the device detection component 228 of the payment object reader 206 generates payload and/or detection sequences adapted based on the available communication ports and in accordance with the communication protocols on which the ports operate (step 412). The payload and detection sequences may be exactly the ones that were used at the time of registration. In other implementations, a unique payload is generated every time. The detection sequences can be in the form of specific signals requesting the device to respond in a certain way. The detection sequences can also be information-gathering requests configured to obtain digital device fingerprints from the buyer devices. Digital device fingerprints include radio, mechanical or operational fingerprints—such as radiated performance, device defects, sensor performance, communication speed or lags, spectrum data, and the like.

The targeted buyer device receives the payload and detection sequences via the appropriate communication ports and protocols (step 414) and responds accordingly. Thus, based on the detection sequences and payload, the buyer device responds in a certain manner, which is captured by the sequences or payload or some other signal and sent to the payment object reader via the same or a different communication channel. In some cases, the responses may be encoded at the buyer device level. The buyer device can also apply tokenized pseudo-random numbers (also referred to as hash keys) to the feature vectors to generate the digital device fingerprint. A National Institute of Standard and Technology (NIST) compliant True Random Number Generator (TRNG) can generate the pseudo-random numbers. The encoding can also be done based on keys generated by a cryptographic unit (not shown). Examples of keys include authentication keys, which include SCP03 master keys (Message Authentication Code Key: MAC, Encryption Key: ENC and Key Encryption Key: KEK, which are 256-bit Advanced Encryption Standard (AES) symmetric keys with associated key derivation data) or Key Agreement Keys (e.g., user server signature verification public key, user server static public key, user static key pair with both public and private key). The encrypted fingerprint can also be created using other schemes, such as fuzzy vault algorithm, a cancelable fuzzy vault scheme based on irreversible hash functions, such as MD, RIPEMD, and SHA. (Step 416.)

The responses form the digital device fingerprints, which are to be used for device identification and authentication of a payment transaction at a later time, are then sent to the payment object reader, as shown in step 418.

At step 420, the payment object reader 206 processes the received fingerprint, e.g., performs signal modulation and conditioning. The reader (or a remoter server) also creates a buyer digital signature or device-payment object relationships including the obtained digital device fingerprints and data pertaining to the transaction, for example, the location and time of the transaction or buyer, or the card information. In one implementation, the payment object reader 206 further encrypts the received digital signature and transmits the encrypted signature via a communication network, e.g., the USB/Wi-Fi connection (step 422), to a central server, such as the payment processing system 114, or keeps it local within an associated database. In one embodiment, the PPS 114 then compares the syntax and content of the buyer digital signature with registered signatures to confirm whether or not buyer digital signature corresponds to a registered device (step 424). In another embodiment, the PPS 114 then transmits the buyer digital signature to one or more buyer mobile devices, such as those determined to be proximate to the POS terminal based on geo-fence data, to determine whether or not the buyer digital signature corresponds to a registered biometric payment instrument.

If the match operation (step 426) as a result of the comparison at step 424 yields a "Yes," the flow transitions to step 428, or optionally to step 432 (as shown). First, the PPS 114 identifies the buyer as a registered user (e.g., after performing the comparison itself, or after receiving a confirmation from a buyer mobile device proximate to the POS terminal after the buyer mobile device performs the comparison, etc.). Then, the PPS 114 authorizes the payment transaction as approved since the device was previously registered (step 428). Alternatively, the payment object reader 206 confirms to check whether there are any rules associated with the device, which restrict authentication via device as shown in step 432.

If the match operation (step 426) as a result of the comparison at step 424 yields a "No," the transaction is not authorized and the buyer may need to provide authentication code in the conventional manner to proceed with the transaction. Optionally, the buyer can register the device as a new device at this time. This device can then be used to authenticate subsequent payment transactions (step 430).

At step 432, the PPS 114 also checks whether the registered device corresponding to the buyer digital signature is associated with any rules or conditions that restrict the use of the registered buyer device as a tool for payment authentication. Additional determination is whether the condition is valid for the current payment transaction. If the condition restricts use of the buyer device for authentication due to the conditions, the flow transitions to step 430. However, if there are no conditions or the condition does not apply to the current transaction, the payment transaction is authenticated through the presence of buyer device. For example, the rules may allow the buyer to use the credit card unconditionally, but the fingerprint connected to the credit card and device may be authorized for a payment of a certain amount only, or unauthorized for certain purchases. Thus, the restrictions can define the time and/or manner in which the buyer can use device as an authentication tool. Conditions on the time of use of the device can include, for example, limiting to or exclusion of specific dates or date ranges, specific days of the week, specific time ranges within a day (e.g., "11:00 AM to 2:00 PM" or "lunchtime"), etc., or any combination thereof. Conditions on the manner of use of the device can include, for example, limiting to or exclusion of specific merchants or types/categories of merchants (e.g., restaurants); limiting to or exclusion of particular goods or services; setting a maximum amount per transaction, or per merchant, or per merchant per transaction (which could apply to a specific merchant or to all merchants); limiting to or exclusion of a particular location or locations where the funds can be used, etc., or any combination thereof. Further, the buyer can be allowed to specify exceptions to some or all of the conditions. Hence, the conditions can be in the form of a whitelist (allowable items), or a blacklist (non-allowable items), or a combination thereof. At least some of the conditions may be hyperlinked to take the buyer to additional pages/screens, to allow the buyer define more-specific conditions.

For example, by using the PPS 114, a parent (the funder or account holder) of a school-age child (the beneficiary and also the buyer whose fingerprint is registered) can allocate $40 from the parent's bank account per week, for use by the child only for the purpose of buying lunch during school days. The funder specifies to the PPS 114 which funds are to be provided, the identity of the beneficiary and the conditions to be imposed on the beneficiary's use of the funds; these items of information collectively form at least part of an "allowance plan" that is stored by the PPS 114 in a database and used by the PPS 114 to regulate the beneficiary's subsequent use of the funds. The PPS 114 has access to an account of the funder that contains those funds and can draw upon those funds as needed.

The beneficiary can then make use of the funds by using one of various predetermined payment mechanisms (discussed further below) to initiate a transaction with a third party, such as a merchant. When the beneficiary initiates a transaction, the PPS 114 receives and evaluates information about the requested transaction against the conditions specified (by the funder) in the allowance plan. Based on that evaluation, the PPS 114 determines whether to authorize payment for the transaction from the specified funds of the funder using the device. In some embodiments, the PPS 114 may receive or determine information that allows it to make a preliminary authorization decision even before a transaction has been initiated.

In response to identification of the buyer's financial account and based at least on one or more conditions (restrictions), the PPS 114 through the acquirer 112 and issuer 114 computing systems, causes the funds to be transferred from the user's financial account to the merchant's financial account (step 436).

If, however, the authorization cannot be made, say due to insufficient funds or a restriction, the POS terminal 104 notifies the buyer that he/she is not a registered and to retry with another object (step 434). The POS terminal 104 may further generate real-time instructions to facilitate the merchant to allow registration at this time. For example, the POS terminal 104 presents real-time and customized instructions, such as, "press a button located at the bottom of the reader," "turn the device off for five seconds" "register your device at this time," "move the device an inch closer to the terminal," "do you need additional assistance?" "connecting to a support representative," "your bank has approved registration," and so on. To this end, the merchant 109 submits user engagement input in response to each of the configuration instructions while the POS terminal waits. Other examples of user engagement input include providing authentication or security keys as a visual, audio or haptic input.

As mentioned before, in some cases, the PPS or the POS terminal can perform the process of registering, either in parallel with the payment object reader or exclusively. In such cases, the process includes establishing one or more communication channels between a plurality of components within the payment system and the communication device through the selected communication port; obtaining, by each of the plurality of components, the device characteristic corresponding to the communication device; generating, by each of the plurality of components, instances of the digital device fingerprints corresponding to the communication device based at least in part on the obtained device characteristic; and then corroborating the instances of the digital device fingerprints to determine the authenticity of the communication device in relation to the transaction activity. And if the corroboration indicates that another component separate from the communication device more accurately matches the authorization standards, the PPS can recalibrate the authorization of the payment transaction.

In some cases, the digital device fingerprint can be an aggregated device fingerprint obtained from a cluster of devices. To this end, a cluster indicator can be accessed to determine whether the registered fingerprint corresponds to a fingerprint from a cluster of buyer devices. This can be performed in selected cases, for example in scenarios where the existing fingerprint has been found to be substantially similar to the digital device fingerprint. In some cases, the cluster indicator can also indicate whether the existing fingerprint includes an order of the cluster of communication devices. The fingerprints corresponding to a cluster of devices are now discussed with reference to FIG. 5.

FIG. 5 is a sequence flow diagram illustrating a method of detecting a cluster of registered devices at the time of a payment transaction, according to another embodiment of the present subject matter. The process 500 can be performed by one or more components, devices, or modules such as, but not limited to, the mobile device, the payment processing system, merchant device or POS terminal, or payment beacon or other components or devices. For the sake of explanation, the description hereinafter is described with reference to components described in FIG. 2. As illustrated in FIG. 5, the process 500 includes a set of operations from block 502 to block 532.

The process 500 starts with the operation at block 502. A buyer 202 with a cluster of buyer devices 202-1, 202-2, . . . 202-N, approaches a checkout area at a merchant location, which is equipped with a payment object reader 206 (step 502) and presents a method of payment, e.g., a payment object like a credit card or a biometric payment instrument, into the payment object reader 206 (step 504) The payment object reader 206 may store the location coordinates of the buyer. The payment object reader 206 scans the payment object that was inserted or otherwise introduced in the payment object reader 206. For example, the payment object reader 206 scans the payment object information, e.g., the last four of the card data (step 506).

After obtaining card information, the payment object reader 206 proceeds to detecting entry of the buyer device 202-1, . . . N through location detection techniques, such as techniques based on triangulation, trilateration, multilaterations, geo-fence, global or local positioning systems, and the like. This step may be performed contemporaneous to the step of scanning the payment object. Additionally, the payment object reader 206 can use buyer location to further zero in on the devices that is most likely to be the buyer's (step 508). Thus, all devices in close proximity to the buyer 202 may be tagged as buyer devices. Optionally, the buyer can indicate which devices, for example through a registration application executing on a mobile device, belong to him. In some implementations, the payment object reader 206 constantly or at predefined intervals scans entry of a buyer device or a specific cluster of buyer devices (in a specific order or without) into a geo-fence of the payment object reader 206. Accordingly, it may sent request for authorization of the payment transaction to the detected devices.

The payment object reader 206 then determines how it can interact with the recognized buyer device or devices. For this, the payment object reader 206 sends preliminary signals or data to explore communication ports in the device, which are available for access and communication. In one implementation, the payment object reader 206 sends signals to a first communication device, or a primary device before probing other devices (step 510). Accordingly, the device detection component 228 of the payment object reader 206 generates payload and/or detection sequences adapted based on the available communication ports and in accordance with the communication protocols on which the ports operate (step 512).

In other implementations, a unique payload is generated every time. The detection sequences can be in the form of specific signals requesting the device to respond in a certain way. The detection sequences can also be information-gathering requests configured to obtain device fingerprints from the buyer devices. Device fingerprints include radio, mechanical or operational fingerprints—such as radiated performance, device defects, sensor performance, communication speed or lags, spectrum data, and the like. The payload may be different for different devices or the same. Further, the payment object reader 206 either queries all relevant devices at the same time or in quick succession. In other implementations, the payment object reader 206 first verifies whether a first device is registered before querying a second or third device.

The targeted buyer devices receive the payload and detection sequences via the appropriate communication ports and protocols (step 514) and respond accordingly. In some cases, the responses may be encoded at the buyer device level. The buyer device can also apply tokenized pseudo-random numbers (also referred to as hash keys) to the feature vectors to generate the device fingerprint. A National Institute of Standard and Technology (NIST) compliant True Random Number Generator (TRNG) can generate the pseudo-random numbers. The encoding can also be done based on keys generated by a cryptographic unit (not shown). Examples of keys include authentication keys, which include SCP03 master keys (Message Authentication Code Key: MAC, Encryption Key: ENC and Key Encryption Key: KEK, which are 256-bit Advanced Encryption Standard (AES) symmetric keys with associated key derivation data) or Key Agreement Keys (e.g., user server signature verification public key, user server static public key, user static key pair with both public and private key). The encrypted fingerprint can also be created using other schemes, such as fuzzy vault algorithm, a cancelable fuzzy vault scheme based on irreversible hash functions, fingerprint minutiae algorithms based on a thinned fingerprint image as opposed to an original fingerprint image using hash functions, such as hash functions, such as MD, RIPEMD, and SHA. (Step 516.)

The responses form the device fingerprints corresponding to each of the devices, along with their location coordinates, which are to be used for device identification and authentication of a payment transaction at a later time, are then sent to the payment object reader, as shown in step 518.

At step 520, the payment object reader 206 processes the received fingerprint, e.g., performs signal modulation and conditioning. The reader (or a remoter server) also creates a buyer digital signature or device-payment object relationships including the obtained device fingerprints and data pertaining to the transaction, for example, the location and time of the transaction or buyer, or the card information. In one implementation, the payment object reader 206 further encrypts the received digital signature and transmits the encrypted signature via a communication network, e.g., the USB/Wi-Fi connection (step 522), to a central server, such as the payment processing system 114, or keeps it local within an associated database. The payment object reader 206 or the payment processing system 114 also saves in the signatures additional details as to the location of the devices with respect to the object. For example, the payment object reader 206 records that a device 202-1 was to the left of the reader, while device 202-2 was located on the right. Further, it may record device particulars, for example the operating system or device type (wearable device, mobile device, tablet, etc.) along with the data. The data mappings are therefore complex and no longer a 1:1 relationships. The device-object relationships in the signature are therefore cluster relationships.

In one embodiment, the PPS 114 then compares the syntax and content of the buyer digital signature with registered signatures to confirm whether or not buyer digital signature corresponds to a registered cluster signature. So, the payment object reader or PPS 114 determines whether the cluster devices and the distribution of the devices in the cluster are matching with the stored signature (step 524). In another embodiment, the PPS 114 then transmits the buyer digital signature to one or more buyer mobile devices, such as those determined to be proximate to the POS terminal based on geo-fence data, to determine whether or not the buyer digital signature corresponds to a registered device.

If the match operation (step 526) as a result of the comparison at step 424 yields a "Yes," the flow transitions to step 528. First, the PPS 114 identifies the buyer as a registered user (e.g., after performing the comparison itself, or after receiving a confirmation from a buyer mobile device proximate to the POS terminal after the buyer mobile device performs the comparison, etc.). Then, the PPS 114 authorizes the payment transaction as approved since the cluster of devices was previously registered (step 528). In some cases, the device fingerprinting may be a secondary or a first method of authorization. The second method of authorization can be a user engagement, in the form or a key or tap entry. To this end, the method includes receiving a request for authorization of the transaction activity on a most proximate payment system in response to a determination of a current geographical location of the communication device and a proximate payment system based on a current geographical location of neighboring payment systems with respect to the communication device; establishing one or more communication links with the payment processing system and through the payment system to send a confirmation message to the buyer, the confirmation message including a confirmation link; and sending, to the payment processing system, an indication of buyer engagement with the confirmation link, wherein the buyer engagement includes an additional identifier selected from a group of a buyer name, a buyer address, a buyer email address, a buyer phone number, a social security number, a passcode set at the time of registration of the communication device, and a transaction detail, wherein the transfer of the money transfer amount is authorized in response to the received indication of the buyer engagement.

If the match operation (step 526) as a result of the comparison at step 424 yields a "No," the transaction is not authorized and the buyer may need to provide authentication code in the conventional manner to proceed with the transaction. Optionally, the buyer can register the device as a new device at this time. This device can then be used to authenticate subsequent payment transactions (step 530).

At step 532, the PPS 114 also checks whether the registered device corresponding to the buyer digital signature is associated with any rules or conditions that restrict the use of the registered buyer device as a tool for payment authentication. Additional determination is whether the condition is valid for the current payment transaction. If the condition restricts use of the buyer device for authentication due to the conditions, the flow transitions to step 430. However, if there are no conditions or the condition does not apply to the current transaction, the payment transaction is authenticated through the presence of buyer device. For example, the rules may allow the buyer to use the credit card unconditionally, but the fingerprint connected to the credit card and device may be authorized for a payment of a certain amount only, or unauthorized for certain purchases. Thus, the restrictions can define the exact combination or location of devices in the cluster (e.g., device 202-1 and 202-2 must be present). Conditions on the manner of use of the device can include, for example, limiting to or exclusion of specific merchants or types/categories of merchants (e.g., restaurants); limiting to or exclusion of particular goods or services; setting a maximum amount per transaction, or per merchant, or per merchant per transaction (which could apply to a specific merchant or to all merchants); limiting to or exclusion of a particular location or locations where the funds can be used, etc., or any combination thereof. For example, requiring devise 202-1 and 202-2 to be present at merchant location A, while devices 202-1, . . . 202-N to be located at other merchants. Further, the buyer can be allowed to specify exceptions to some or all of the conditions. Hence, the conditions can be in the form of a whitelist (allowable items), or a blacklist (non-allowable items), or a combination thereof. At least some of the conditions may be hyperlinked to take the buyer to additional pages/screens, to allow the buyer define more-specific conditions.

If, however, the authorization cannot be made, say due to restriction, the POS terminal 104 notifies the buyer that he/she is not a registered and to retry with another object (step 534). The POS terminal 104 may further generate real-time instructions to facilitate the merchant to allow manual entry of an authorization code at this time. To this end, the merchant 109 submits user engagement input in response to each of the configuration instructions while the POS terminal waits. Other examples of user engagement input include providing authentication or security keys as a visual, audio or haptic input.

Figure 6:
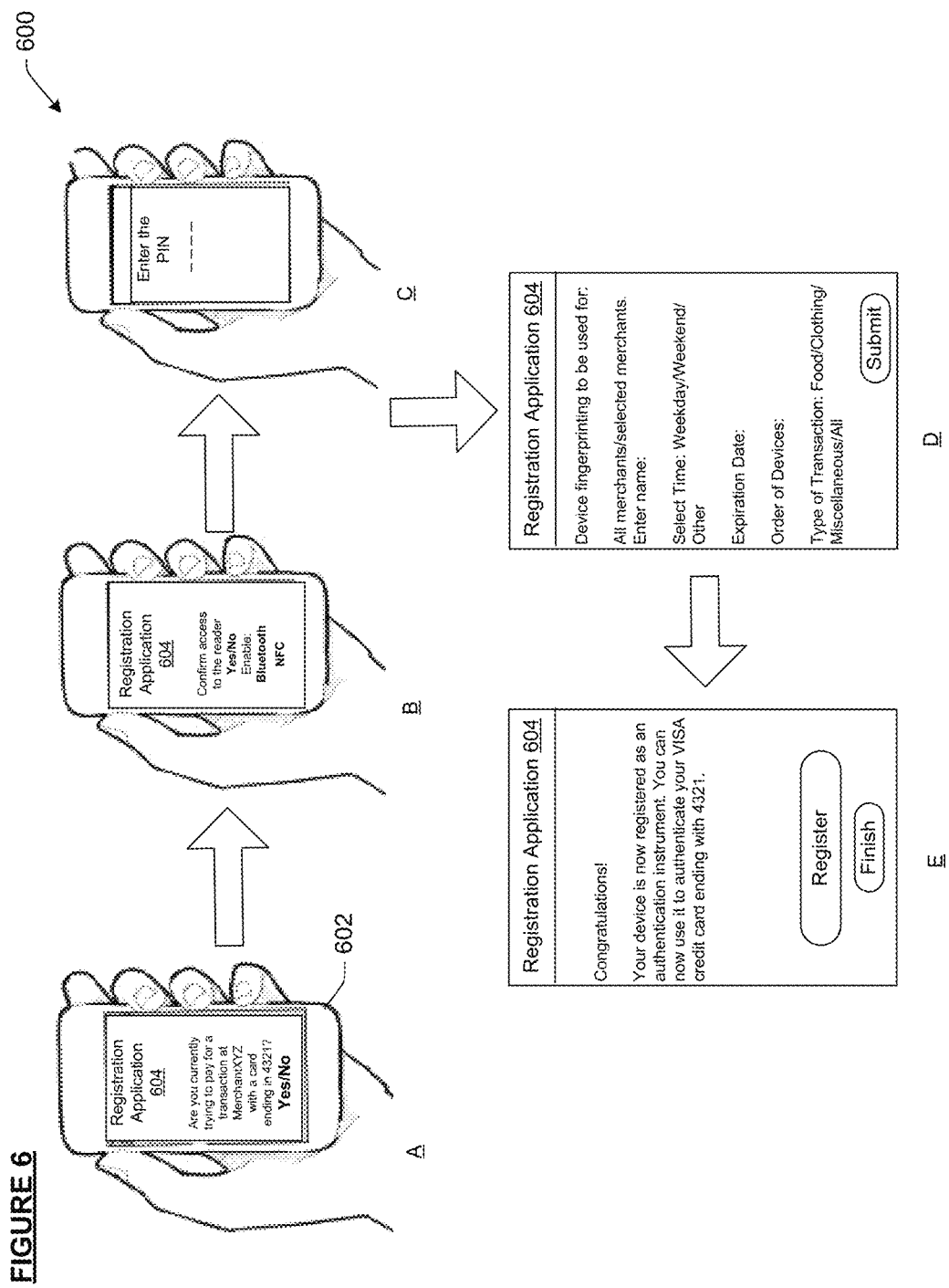
FIG. 6 is a diagram that illustrates an exemplary registration flow showing graphical interfaces on a buyer device, according to an embodiment of the present subject matter.

FIG. 6 is a sequence flow diagram 600 that illustrates an example registration flow showing graphical interfaces on a buyer device, according to an embodiment of the present subject matter. Once registered, the device can be used in various interactions, for example in authentication or authorization of payment transactions, to target a buyer with rewards and coupons, for customized advertising, for pre-orders, for delivery of pre-orders, and the like.

The sequence flow method 600 is applicable both in embodiments in which the registered device characteristic stays resident solely on the payment object reader and also in embodiments in which the registered device characteristic is transmitted from the mobile device or the payment object reader to PPS 114, according to embodiments of the present subject matter. For ease in understanding, assume that the merchant implements device fingerprinting as a way to authenticate payment transactions. Even though events A-E, in one example scenario, are in sequence; other sequences are also possible.

The user interfaces A-E may allow for the display, execution, interaction, manipulation, and/or operation of program components and/or system facilities through textual and/or graphical facilities through one or more interaction interface elements, such as check boxes, cursors, menus, scrollers, and windows (collectively and commonly referred to as widgets) to facilitate the access, capabilities, operation, and display of data and computer hardware and operating system resources, and status. The user interfaces may be used to provide a baseline and means of accessing and displaying information graphically to users. The user interface may also be a graphic user interface as provided by, with, and/or atop operating systems and/or operating environments such as discussed herein.

In various embodiments, the user interface is relayed on an audio or video display with a touch screen and driver, the touch screen being based upon a variety of later-developed or current touch screen technology including resistive displays, capacitive displays, optical sensor displays, electromagnetic resonance, or the like. Additionally, touch screen display may include single touch or multiple-touch sensing capability. Any display technology may be used for the output display, such as a Liquid Crystal Display (LCD) or solid state device such as light-emitting diode (LED) or organic light-emitting diode (OLED), a thin film transistor (TFT) display, Plasma display, trans-reflective (Pixel Qi) display, electronic ink display (e.g. electrophoretic, electrowetting, interferometric modulating).

In various embodiments, the resolution of such displays and the resolution of such touch sensors may be set based upon engineering or non-engineering factors (e.g. sales, marketing). In some embodiments, speakers and LED indicators can be used to present audio and visual identifiers of transaction and device status.

To detect and validate whether a buyer's mobile device is registered with a payment object introduced in a payment object reader. Once detected in a payment object reader's proximity, the payment object reader generates a message to confirm if the person associated with the device is performing a payment transaction. This is particularly helpful if there are several buyers and payment object readers in a small area. The user interface A of the buyer device 602 reflects an example message "Are you trying to attempt a payment at merchant XYZ with a card ending in 4321." The messages shown may be generated in a messaging application 604 or as part of a text or email notification.

The user interface B of the mobile device 602 presents the user with another message to confirm if they allow the payment object reader to access the device to obtain device characteristics. At this time, the payment object reader through the mobile device 602 can also display a message to indicate additional device configuration changes that need to be made to allow the payment object reader to access the components embedded in the device. For example, the payment object reader determines that connection via Bluetooth and NFC is not available. The reader establishes a Wi-Fi connection with the device, and indicates in the message to enable NFC and Bluetooth. This too can be part of the user interface B. For example, the message can be of the form "confirm access to the reader and enable Bluetooth and NFC."

The user interface C of the mobile device 602 requests the user to enter the password or CVV or the like associated with the payment object to allow registration of the device with the payment object that was introduced in the payment object reader. At this time, the payment object reader obtains device characteristics, e.g., physical, mechanical, magnetic, electro-mechanical, or operational characteristics, or a combination thereof and stores the relationships of the payment object with the characteristics, encoded or not, in a database, either within the payment object reader or associated with the payment object reader or payment processing system.

The user interface D of the mobile device 602 presents the user with options to set conditions or limits to the use of device as a payment instrument. For example, another user such as the account holder can specifies one or more conditions (restrictions) to be applied to the beneficiaries or the buyer's use of the device as an authentication mechanism. The conditions can include, for example, conditions upon the time and/or manner of use of the device. Conditions on the time of use of the device can include, for example, limiting to or exclusion of specific dates or date ranges, specific days of the week, specific time ranges within a day (e.g., "11:00 AM to 2:00 PM" or "lunchtime"), etc., or any combination thereof. In case of multiple buyer devices, the conditions may relate to the order or combination in which the devices should be present. Conditions on the manner of use of the device can include, for example, limiting to or exclusion of specific merchants or types/categories of merchants (e.g., restaurants); limiting to or exclusion of particular goods or services; setting a maximum amount per transaction, or per merchant, or per merchant per transaction (which could apply to a specific merchant or to all merchants); limiting to or exclusion of a particular location or locations where the funds can be used, etc., or any combination thereof. Further, the buyer can be allowed to specify exceptions to some or all of the conditions. Hence, the conditions can be in the form of a whitelist (allowable items), or a blacklist (non-allowable items), or a combination thereof. At least some of the conditions may be hyperlinked to take the funder to additional pages/screens, to allow the funder define more-specific conditions. Thus, a parent can set an authentication free option using registered device for their children by registering their devices with their payment objects. The parents can also set limits to the amount the child can use for purchases.

The user interface E of the mobile device 602 presents the user a message confirming successful registration of the fingerprint as a biometric payment instrument.

It will be understood the user interfaces A-E are only for the purpose for illustration. The content, format and layout may vary from one device and one operating system to another. Further the content can vary based on various factors such as the method of device fingerprinting, and rules set by the merchant or customer or both.

Figure 7:
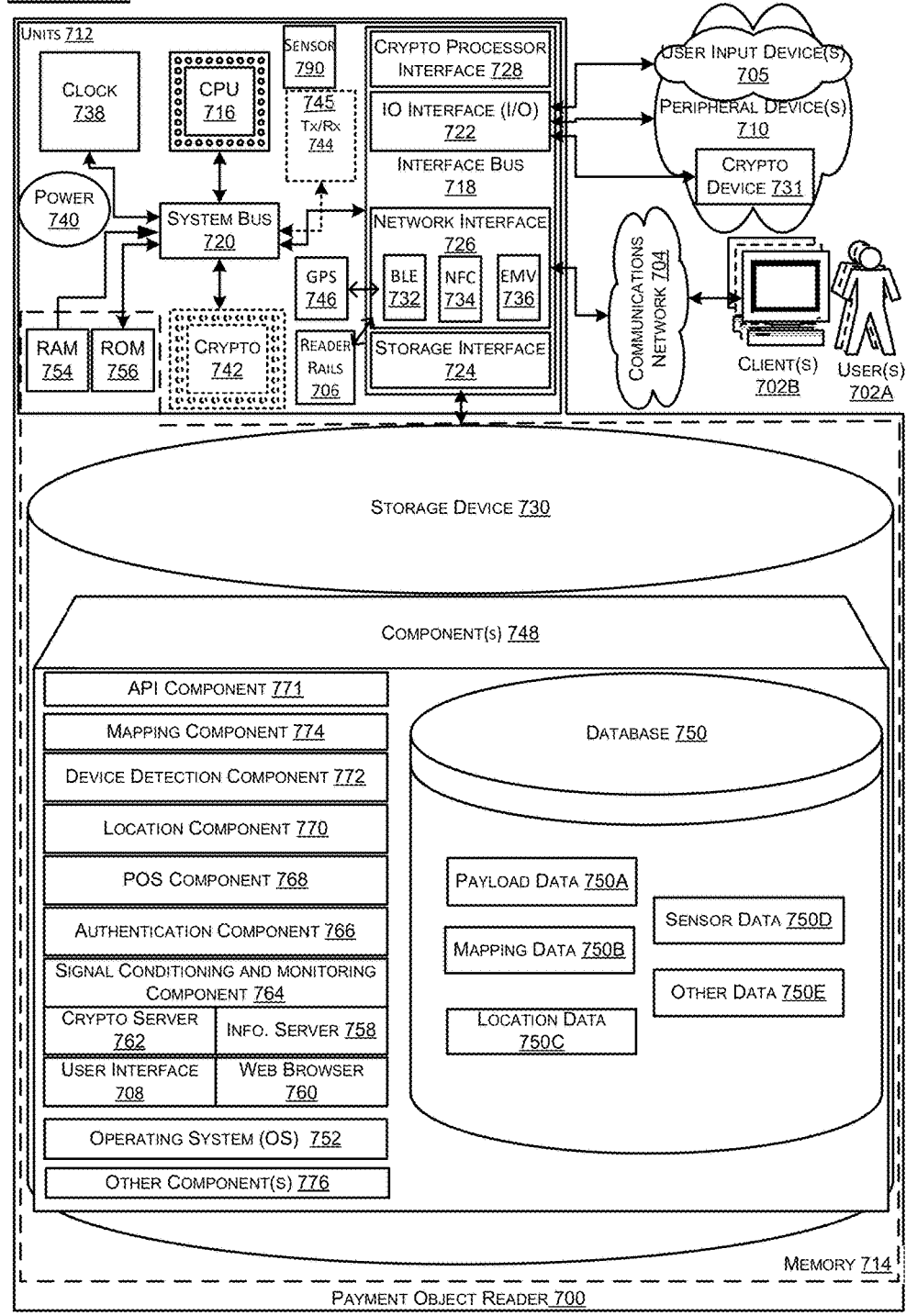
FIG. 7 is a block diagram illustrating components of a payment object reader, according to an embodiment of the present subject matter.

FIG. 7 is a block diagram illustrating embodiments of a payment object reader 700 configured to allow processing of payment transactions between entities, such as a merchant and a buyer, or a sender and recipient of funds by authorizing transactions initiated by registered devices. In one embodiment, the payment object reader 700 may serve to aggregate, process, store, search, serve, identify, instruct, generate, match, and/or facilitate interactions with a computer through various technologies, and/or other related data. The payment object reader 700 may be used to collect data for later retrieval, analysis, and manipulation, which may be facilitated through an internal or external database. For example, the payment object reader 700 on receiving payment related information may complete the transaction, generate receipt as proof of the transaction, update inventory of the product after the transaction, and obtain data related to the buyer involved in the transaction, such as transaction history, location data, and the like. In some implementations, the components of the payment object reader 700 can also be found in a buyer device (for example, a mobile phone of a buyer), a merchant device (for example, a point-of-sale terminal for processing payment transactions), a remote, cloud-based central server such as payment processing system, and a payment beacon to send and receive static or dynamic information, for example, the payment proxy, transaction summary or receipt, either perpetually or on activation. The devices may have fewer or more components than defined here as will be clear by context.

The payment object reader 700 may communicate with a POS terminal (e.g., transaction processing software applications executing on a tablet, or a computer) and various neighboring and remote, but connected, devices, such as buyer devices. The payment object reader 700 has the circuitry and logic to register a new device presented at the time of transaction along with a payment object, and mapping the device with the object or without the object for any subsequent payment transactions. The device may be registered in a variety of ways based on the characteristics that are obtained. For example, if the radiated performance is to be used as a factor in device registration and identification, the antenna transmitter and receiver of the payment object reader 700 are initialized. In another example, if the manufacturing tolerances are to be measures, components like the sensors and accelerometers of the payment object reader 700 are activated.

Users 702A, who may be buyers, merchants, consumers, senders or recipients of funds, buyers, sellers, and/or other entities or systems, may engage information technology systems (e.g., computers, mobile devices, laptops, servers) to facilitate processing of information, such as transactional, financial, and so on. It should be noted that the term "server" as used throughout this application refers generally to a computer, other device, program, or combination thereof that processes and responds to the requests of remote users across a communications network. Servers serve their information to requesting "clients" 702B connected to the users 702A. The term "client" or "buyer device" as used herein refers generally to a computer, program, other device, user and/or combination thereof that is capable of processing and making requests and obtaining and processing any responses from servers across a communications network 704. Networks 704 facilitate the transfer of information from source points to destinations. The users (e.g., merchants) may directly interact with the payment object reader 700, e.g., via the user inputs devices 605.

In one implementation, the payment object reader 700 can be configured to receive a payment card or payment card information to process payment card transactions (i.e., those involving reading of a payment card physically provided by the buyer at the merchant's location), as well as card-not-present (CNP) transactions (i.e., those where the instrument is not physically presented at the time that the payment is effected, e.g., through payment proxy), either through a card reader 606 or by providing a graphical user interface 708 to accept financial account information of the user 702A initiating the payment. A payment card transaction may be any transaction where a merchant or a buyer uses a payment card to purchase a product or service offered by the merchant, for example, by swiping a user's credit card through a magnetic rails or chip contacts 706 or by providing the information through voice, text, or other wired or wireless data communication techniques. The term "swipe" here refers to any manner of triggering a magnetic rails or chip contacts 706 to read data from a payment card, such as by passing a card into or through a magnetic stripe card reader, optical scanner, smartcard (card with an embedded IC chip) reader (e.g., an EMV-compliant card reader or NFC enabled reader), radio frequency identification (RFID) reader, or the like. The magnetic rails or chip contacts are integrated within the payment object reader 700 (as shown) or connected externally with the PPS controller 700 and/or client(s) 702B as peripheral devices 710. If the card reader 706 is connected externally, the peripheral devices 710 may be connected via wired or wireless communication network 704 and interact to each other through customized interfaces. In one implementation, the payment object reader 700 can be connected to an audio plug of another device, such as the POS terminal. If the payment object reader 700 is integrated within the POS terminal, the one or more interfaces and components can be configured to accept payment data through various communication protocols. Accordingly, hardware implementation may include creation of slots, magnetic tracks, and rails with one or more sensors to facilitate a user 702A, e.g., a merchant, to detect and accept a payment card. In one implementation, the payment card and the peripheral devices 606 may support the same technology for short-range (typically less than 100 meters) and/or low power wireless communication protocols and technologies, such as Bluetooth Low Energy (BLE), standard Bluetooth, WiFi, Near Field Communication (NFC) or Radio-Frequency Identification (RFID). According to the communication protocol preferred or implemented, the payment object reader 700 may require additional steps to configure the rails or chip contacts 706 to operate and work alongside the payment object reader 700. For example, a pairing component (described later) may be used to connect, synchronize, and pair various devices to facilitate exchange of data obtained off the payment card.

The term "payment card' or 'payment object' refers to a payment mechanism that includes a conventional debit card, a conventional credit card, a prepaid gift card, or the like, a smartcard that has an embedded integrated circuit chip (e.g., Europay-MasterCard-visa (EMV) card), a proxy card, or any card that functions as a combination of any of these mechanisms. The term "proxy card" as used herein refers to a card that may or may not have a card number/account number that appears to be that of a real credit or debit card account (i.e., it is in the correct format), but where that card/account number is actually only a proxy for the buyer's real card/account number. The card/account number generally adheres to a naming standard set by the financial institution associated with or issuing the payment card. Other examples of payment card may also include a prepaid card, a gift card, a rewards card, a loyalty points card, a frequent flyer miles card, a check, cash, or any other kind of payment instrument that holds financial value or provides a promise to pay at a later time.

The payment card used in the example above is one type of a financial instrument. Other types of financial instruments, other than the payment card, can be used to initiate the transfer of funds. Another example of a financial instrument is a biometrically identifiable instrument, such as a person's finger (e.g., for fingerprint recognition), face, iris or retina, heartbeat, voice pattern, genetic parameter unique to the user, etc. Alternatively, a financial instrument can be a software instrument or virtual instrument, such as a virtual wallet, optionally embedded in a hardware device to enable contact or contactless payments.

Payment Object Reader Architecture

In one implementation, the payment object reader 700 may be based on computer systems that may comprise, but are not limited to, PPS units 712 and memory 714. Furthermore, PPS units can comprise hardware and/or software components, referred to as PPS units 712, which may comprise a central processing unit ("CPU(s)" and/or "processor(s) and/or microprocessor(s)" (these terms are used interchangeably)) 716 and an interface bus 718, which may be interconnected and/or communicating through a system bus 720 on one or more motherboard(s) having conductive and/or otherwise communicative pathways through which instructions (e.g., binary encoded signals) may travel to enable communications, operations, storage, etc. The interface bus 718 may also include other interfaces or adapters specific to network, storage, peripherals, and input-output interface(s), through which data may pass into and out of a computer and which allow users to access and operate various system components. The interface bus 718 may be connected to external units, such as peripheral devices 710 or client(s) 702B via communication network 704. Each of the exemplary components 712 is now described in detail.

Processor(s)

The CPU 716 may incorporate various specialized processing units, such as, but not limited to: integrated system (bus) controllers, memory management control units, floating point units, and even specialized processing sub-units like graphics processing units, digital signal processing units, and/or the like. In various embodiments, the processor core may be a low-power/ultra-low power/low-cost microcontroller; examples include an Intel Processor like Intel Atom, Apple A4, NVidia Tegra 2, Marvell Armada, Qualcomm Snapdragon, Samsung Hummingbird and Exynos, Texas Instruments OMAP and MSP microcontroller, ARM Holdings processor like the Cortex-A, -M -R, Series, or ARM series and/or the like processor(s). Should processing requirements dictate a greater amount speed and/or capacity, distributed processors (e.g., Distributed payment object reader 700), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the payment object reader 700 may be achieved by implementing a microcontroller, such as Freescale's Kinetis K21D; and/or the like. Also, to implement certain features of the payment object reader 700, some feature implementations may rely on embedded components, such as: Application-Specific Integrated Circuit ("ASIC"), Digital Signal Processing ("DSP"), Field Programmable Gate Array ("FPGA"), and/or the like embedded technology. Depending on the particular implementation, the embedded components may include software solutions, hardware solutions, and/or some combination of both hardware/software solutions.

Interface Bus and Adapters

Interface bus(ses) 718 may accept, connect, and/or communicate to a number of interface adapters, although not necessarily in the form of adapter cards, such as but not limited to: input-output interfaces (I/O) 722, storage interfaces 724, network interfaces 726, and/or the like. Optionally, cryptographic processor interfaces 728 may be connected to the interface bus 718.

Storage interfaces 724 may accept, communicate, and/or connect to a number of storage devices such as, but not limited to: storage devices 730, removable disc devices, and/or the like. Storage interfaces 724 may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), fiber channel, Small Computer Systems Interface (SCSI), Universal Serial Bus (USB), and/or the like.

Input-Output interfaces (I/O) 722 may accept, communicate, and/or connect to user input devices 705, peripheral devices 710, such as externally connected card readers, cryptographic processor devices 731, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); USB 2.0; USB 3.1; USB Type C; Ethernet; infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, Li-Fi etc.); and/or the like. In various embodiments, an audio or video display with a touch screen and driver may be included, the touch screen being based upon a variety of later-developed or current touch screen technology including resistive displays, capacitive displays, optical sensor displays, electromagnetic resonance, or the like. Additionally, touch screen display may include single touch or multiple-touch sensing capability. Any display technology may be used for the output display, such as a Liquid Crystal Display (LCD) or solid state device such as light-emitting diode (LED) or organic light-emitting diode (OLED), Plasma display, trans-reflective (Pixel Qi) display, electronic ink display (e.g. electrophoretic, electrowetting, interferometric modulating). In various embodiments, the resolution of such displays and the resolution of such touch sensors may be set based upon engineering or non-engineering factors (e.g. sales, marketing). In some embodiments, speakers and LED indicators can be used to present audio and visual identifiers of transaction and device status. In addition, buttons may be configured to power Payment object reader 700 on or off, operate the controller or reset the controller 600.

In some embodiments of the payment object reader 700, image capture device may be included, which may further include a sensor, driver, lens and the like. The sensor may be based upon any later-developed or convention sensor technology, such as CMOS, CCD, or the like. Image recognition components may be provided to process the image data. For example, such components can support functionalities including, but not limited to, barcode detection, facial recognition, camera parameter control, etc.

Network interface(s) 726 may be regarded as a specialized form of an input-output interface. One or more network interfaces 726 may be used to engage with various communications network types 704. For example, multiple network interfaces may be employed to allow for the communication over broadcast, multicast, and/or unicast networks. Through a communications network 704, the PPS controller 700 is accessible through remote clients 702B (e.g., computers with web browsers) by users 702A. Network interfaces 726 may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed PPS architectures may similarly be employed to pool, load balance, and/or otherwise increase the communicative bandwidth required by the payment object reader 700.

In some implementations, the network interfaces 726 may be communicatively coupled to hardware components, which facilitate detection of payment cards. For example, the network interfaces 726 may couple to a payment card slot or rail designed to accept payment cards through swipe or insertion or any other action. In another example, the network interfaces 726 may couple to one or more sensors included to detect presence of payment card or a tap of the payment card onto a surface of the payment object reader 700.

In various embodiments, the network interface 726 may also support wireless data transfers between the Payment object reader 700 and external sources, such as clients 602B and cameras, or the like. Wireless protocols may include Wi-Fi (e.g. IEEE 802.11a/b/g/n, WiMax), Bluetooth or Bluetooth low energy (BLE); infrared, and the like, through BLE interface, WiFi interface, QR interface, NFC interface, EMV interface, cellular technology interface, and other interface(s), described subsequently.

According to one implementation, BLE interface ("BLE") 732 is configured to work on Bluetooth® or BLE® protocol to facilitate communication with a BLE transceiver installed on other devices. In one implementation, BLE is intended for low-power and low-latency applications for wireless devices within a short range, such as up to about 50 meters. BLE interface 732 may be used in applications requiring intermittent communications, smaller amounts of data transfer and bandwidths, and/or low duty cycles. BLE interface 732 can be configured to use only a fraction of the power as compared to other interfaces. In many cases, BLE interface 732 may be able to operate more than a year on the power source without charging.

BLE interface 732 is capable of being paired with a peripheral device, such as another reader, a payment card, or a client 702B associated with a user 702A, thus allowing the payment object reader 700 to (a) serve as a "beacon" and broadcast data and/or (b) become a relay point between the payment object reader 700 and payment card, card reader 706 or a client 702B serving as a point of sale terminal for a merchant. The BLE interface 732 allows the controller 700 with BLE interface 732 can be placed at merchant locations, museums, ski resorts, state parks, entertainment venues, parking garages, etc.

As defined herein, a beacon is a short range communication device having a known or fixed location that provides a signal that can be detected by mobile devices within proximity of the beacon. For example, BLE interface 732 can transmit a radio frequency (RF) signal that includes its position coordinates (e.g., latitude, longitude), which can be detected by a mobile device. Alternatively, BLE interface 732 can transmit other data, such as payment proxy related to the financial account information of the user 702B.

The payment object reader 700 BLE beacon allows for constant, scheduled or random scanning of other Bluetooth peripherals and devices. In one implementation, a component, such as BLE interface component, within the Payment object reader 700 and/or the client 702B can be set to run in the background under a BLE protocol, persistently, intermittently or on activation monitoring for a significant change in location and/or presence of an appropriate BLE peripheral or beacon at a merchant or vendor location. BLE beacon also allows for persistent or intermittent transmission of data. For example, BLE beacon may persistently transmit or receive information related to payment proxy associated with the client 702B or payment object reader 700.

When the owner or user of the client 702B or payment card enters a store having payment object reader 700 as a point of sale terminal, he or she would get in the BLE network radius of the payment object reader 700. Payment object reader 700 then serves as a bidirectional conduit for the card reader 706 to communicate with the CPU 724 collecting or handling the credit card transaction. Along with receiving transaction data or any other data by the BLE interface 732, the payment object reader 700 may also encrypt, decrypt, or store the data for future processing. It does these actions in addition to running the payment application itself, which may display items for sale, up-sell based on purchases, allow confirmation of purchases, application of coupons, the ability to provide feedback, etc.

In one implementation, the payment object reader 700 or the client 702B may be connected to a BLE peripheral device having BLE interface 732 functionalities. In some implementations, the payment card may include a chip supporting BLE functionalities. A control logic unit (not shown) may also be included to bridge BLE interface either to ISO 7816 contact interface or ISO 14443 contactless interface to provide for autonomous bi-directional data transfer between paired devices. In one implementation, the payment object reader 700 is capable of communicating using Bluetooth, and is thus able to pair with a peripheral device 710 to obtain payment object information from a phone that at least has Bluetooth capabilities. In one implementation, a plurality of BLE peripheral devices may be connected via the BLE protocol, or other communication network, to form a mesh network. Such a mesh network may allow for transfer of data between the peripheral devices, even those that are more than the distance prescribed by the BLE protocol.

Similar to BLE beacons, data can be exchanged using other kind of RF beacons, infrared beacons, cellular communications (CDMA, GSM, LTE, etc.), beacons, pattern generation beacons, such as barcodes, Quick Response (QR) codes, or a radio frequency identifier (RFID) tag. QR code or NFC may have short range but high accuracy; Wi-Fi or Bluetooth may have mid-range and medium accuracy; and cellular may have long-range but low accuracy. In some embodiments, the controller 700 can receive and permanently store payment information so that the controller 600 acts as a payment object that does not require a payment card or other payment object to be present.

In one example, an NFC interface 734 ("NFC") can allow for close range communication using standards such as ISO 18092, ISO 21481, TransferJet® protocol and in compliance with FIME certifications. Close range communication with the NFC interface may take place via magnetic field induction, allowing an NFC interface chip 634 to communicate with other NFC devices or to retrieve information from tags having RFID circuitry via the NFC interface. In instances where it is desired to read an NFC enabled payment object, or an NFC enabled payment object is determined to be in proximity to the CPU 716 may be configured to drive antenna 745 via a driving circuit (not shown) to induce a magnetic field capable of being modulated by the NFC enabled payment object. From here, the modulated magnetic field signal may be converted into a digital signal that CPU 716 can interpret via the NFC component 772. On the other hand, when it is desired to transmit data via antenna 745, CPU 716 may be configured to disable the driving circuit and transmit data using the NFC protocol by instructing a NFC modulator (not shown) to modulate the magnetic field to which antenna 745 is operatively coupled. In some embodiments, there can be a switch within the NFC modulator to turn on or off the load applied to the antenna 745. The switch can be under the control of the CPU 716. In some embodiments the antenna 745 can drift from a desired frequency (become detuned). This can be the result of a metal object being in the proximity of device 610 or reader 700. The monitor circuit (not shown) can monitor the frequency of the antenna 745, and determine when the frequency of the antenna 745 has drifted away from the desired frequency. When the it is determined that the NFC antenna 745 is out of tune, NFC antenna monitor circuit can work in concert with the CPU 716 to vary one or parameters such as capacitance, voltage, or impendence of the antenna 745 to tune the NFC antenna 745. The antenna 745 along with transmitter-receiver 644 is configured to detect characteristics, such as radiated performance, radiated signal strength, frequencies, etc., via radio communication protocol.

In another example, an EMV interface 736 ("EMV") can allow the payment object reader 700 to accept Chip and PIN cards follow technical standards more formally known as EMV, after Europay, MasterCard and Visa (EMV). In one implementation, the EMV interface complies with EMV's Level 1, Level 2 and Level 3 certifications. In some instances, CPU 716 receives payment data read by the EMV interface 736 via the card contacts (not shown), or alternatively from a magnetic stripe reader reading payment data from a magnetic stripe card. The payment data received at the CPU 716 is stored, either temporarily or permanently, in memory 714 of the reader 700. The payment data stored in memory can then be transmitted via the NFC antenna 718. The network interfaces 726 may work in conjunction with components explained later.

In other implementations, a plurality of beacon technologies may be used based on specific accuracy or power requirements. Such technologies may be combined based on weight or some other relationship. In yet another implementation, selections may be made based on user preference or availability of the beacon technology at that time. For example, the reader 700 may be configured to provide and detect a plurality of beacons. For example, if a camera is on, a QR code on the client 702B display may be read, for example to pair two payment devices. If only cellular is on, a modem may detect a femtocell may be nearby. The client 702 B, such as a merchant's register or point of sale terminal, may combine data from the multiple beacons and use such data for analysis of transactions over a course of time. For example, the buyer device 702B may be configured to use Wi-Fi RSSI/RTT and BT RSSI/RTT measurements from a first beacon, QR code value from a second beacon, and WiFi RSSI and cellular measurements from a third beacon for accurately identifying and establishing secured connections with the buyer device 702B.

The beacons can be dynamic with data and other beacon parameters changing as per environment or the type of device pairing with the reader 700; in other implementations, the beacons can be static and displayed using LED displays, electronic displays, or the like, described with reference to I/O interface. In one embodiment, the Payment object reader 700 may also be connected to and/or communicate with entities such as, but not limited to: one or more users, for example users 602A, associated with user input devices 705; one or more users 602A through their respective buyer devices 702B; peripheral devices 710; an internal or external cryptographic processor device 731; and/or a communications network 704.

Communications Network

The network 704 can include any combination of local area and/or wide area networks, using both wired and wireless communication systems. In some embodiments, the network 704 uses standard communications technologies and/or protocols. Thus, the network 704 can include links using technologies such as Ethernet, 802.11, a Wi-Fi, a Bluetooth network; and/or the like worldwide interoperability for microwave access (WiMAX), 3G, 4G, CDMA, digital subscriber line (DSL), etc. Similarly, the networking protocols used on the network 608 may include multiprotocol label switching (MPLS), transmission control protocol/Internet protocol (TCP/IP), hypertext transport protocol (HTTP), and/or file transfer protocol (FTP). Data exchanged over the network 708 can be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec). Additionally, the communication network may be a mesh network. For example, in a wireless local area network (WLAN), network devices may be configured to receive and forward communications which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP.

Clock

Clock 738 may have a crystal oscillator that generates a base signal through the reader's circuit pathways. The clock 738 may be coupled to the system bus 720 and various clock multipliers that increase or decrease the base operating frequency for other components interconnected in the Payment object reader 700.

Power Source

The units 712 may also include a power source 740. The power source 640 may be of any form capable of powering small electronic circuit board devices such as the following power cells or batteries: alkaline, lithium hydride, lithium ion, lithium polymer, nickel cadmium, solar cells, and/or the like. Other types of AC or DC power sources may be used as well. The power source 740 is connected to at least one of the interconnected subsequent components of the Payment object reader 700 thereby providing an electric current to all subsequent components. In one example, the power source 740 is connected to the system bus 704. In an alternative embodiment, an outside power source 740 is provided through a connection across the I/O 722 interface. For example, a USB connection can carry both data and power across the connection and is therefore a suitable source of power. To this end, coupled to power source 740 may be a USB micro interface (not shown) configured to receive a USB micro jack, although other types of connectors are anticipated. In certain embodiments, connection of a jack to USB micro interface can activate a switch within power source 740 to override power supplied by the battery. This allows for battery power to be conserved for situations where external power cannot be provided. Furthermore, power source 740 may also include a battery charger to allow the battery to be charged when external power is supplied via USB micro interface.

In one implementation, the power source 740 may include a selector (not shown) to selectively power one or more units within the payment object reader 700. For example, the power source 740 may power the BLE network interface and BLE component and power the CPU 716 only on receiving a wake up signal, using an activation signal, triggered by a tactile, visual, or audio input. To this end, the payment object reader 700 may include wake-up electronics (not shown) configured to wake-up the payment object reader 700 from a low-power state to an active state in response to detection of a payment object. In some embodiments, wake-up electronics can also power down payment object reader 700 to a low-power state after a predetermined amount of time or after completion of a communication.

Cryptographic Processor

A cryptographic processor 742 and/or transceivers (e.g., ICs) 644 may be connected to the system bus 720. In another embodiment, the cryptographic processor and/or transceivers may be connected as either internal and/or external peripheral devices 710 via the I/O interface bus 722. To this end, the transceivers 644 may be connected to antenna(s) 745, thereby enabling wireless transmission and reception of various communication and/or sensor protocols. For example the antenna(s) may connect to a transceiver chip or a wireless microcontroller targeting Bluetooth applications, e.g., providing 802.11n, Bluetooth 4.2, Bluetooth 2.1+EDR, FM, GSM/EDGE/GPRS/2G/3G/HSDPA/HSUPA/LTE (4G) communications, global positioning system (GPS) thereby allowing payment object reader 700 to determine its location, for example. A separate GPS unit 746 (also referred to as the location component) may be used to determine the location of a merchant or buyer performing a payment transaction using a payment card. The GPS unit may work on any of the protocols mentioned above. The location information may be used to advertise location specific information to the user.

Furthermore, the communicative instructions may be stored and/or transmitted in batches (e.g., batches of instructions) as programs and/or data components to facilitate desired operations.

Peripheral Devices

Peripheral devices 710 may be connected and/or communicate to I/O interface 722 and/or other facilities of the like such as network interfaces, storage interfaces, directly to the interface bus 718, system bus, the CPU, and/or the like. Peripheral devices 710 may be external, internal and/or part of the Payment object reader 700. Peripheral devices 710 may include: antenna, audio devices (e.g., line-in, line-out, microphone input, speakers, etc.), cameras (e.g., still, video, webcam, etc.), dongles (e.g., for ensuring secure transactions with a digital signature, and/or the like), external processors (for added capabilities; e.g., crypto devices 731), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like.

The card reader 700 may comprise user interfaces, such as, for example, a PC/SC EMV L1/L2/NFC certified Smart Card Reader, a keypad for PIN entry, such as key keypad, a display, such as the illustrated LCD display, etc., and electrical interfaces, an interface for back-up battery power, an interface for a display, a power interface, LED lights for indicating status of a transaction, a buzzer, etc. The card reader may be, for example, PCI v3 compliant and configured to facilitate the acceptance of credit/debit card payments.

A sensor 790 may be included. In some embodiments, the sensor 790 may include accelerometers, antenna decouplers, signal generator, signal modification and conditioning components to detect certain characteristics of neighboring devices. The characteristics are generally physical, mechanical or design related. The sensor 790 is also capable of sending and receiving signals or test parameters, the parameters are then compared internally to determine whether the values correspond to a known device.

Peripheral devices 710 may also include sensors, devices, and subsystems can be coupled to network interface to facilitate multiple functionalities. For example, motion sensor, magnetic, light sensor, and proximity sensor can be coupled to network interface to facilitate orientation, detection, lighting, and proximity functions of the payment object reader 700, by analyzing any input, such as audio, visual, tactile, mechanical, electrical, magnetic, hydraulic, electromagnetic input, and the like. Location processor (e.g., GPS receiver similar to GPS 646) can be connected to the network interface to provide geo-positioning. Motion sensor can include one or more accelerometers configured to determine change of speed and direction of movement of the payment object reader 700. Magnetic sensors may detect presence or absence of a payment card and differentiate a payment card from other cards.

Peripheral devices 710 may also include a camera subsystem and an optical sensor, e.g., a charged coupled device (CCD) or a complementary metal-oxide semiconductor (CMOS) optical sensor, can be utilized to facilitate camera functions, such as recording photographs and video clips.

Peripheral devices 710 may also include an audio subsystem can be coupled to a speaker and a microphone to facilitate voice-enabled functions, such as voice recognition, voice replication, digital recording, and telephony functions. Audio subsystem can be configured to receive voice commands from the user.

Peripheral devices 710 may also include an I/O subsystem that can include touch surface controller and/or other input controller(s). Touch surface controller can be coupled to a touch surface or pad. Touch surface and touch surface controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface. Touch surface can include, for example, a touch screen.

Other input controller(s) can be coupled to other input/control devices, such as one or more buttons, rocker switches, thumb-wheel, infrared port, USB port, and/or a pointer device such as a stylus. The one or more buttons (not shown) can include an up/down button for volume control of speaker and/or microphone.

In one implementation, a pressing of the button for a first duration may disengage a lock of the touch surface; and a pressing of the button for a second duration that is longer than the first duration may turn power to PPS controller 100 on or off. The user may be able to customize a functionality of one or more of the buttons. The touch surface can, for example, also be used to implement virtual or soft buttons and/or a keyboard. The touch surface may also activate the PPS controller to actively relay information. At all other times, the reader 700 may be dormant to conserve power.

User input devices 705 often are a type of peripheral device 710 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like. The card readers, as mentioned before, may be configured to read a variety of payment cards. Such card readers may either be dongle like or puck style.

Cryptographic units such as, but not limited to, microcontrollers, processors 716, interfaces 718, and/or devices 731 may be attached, and/or communicate with the payment object reader 700. Cryptographic units support the authentication of communications from interacting agents, as well as allowing for anonymous transactions. Cryptographic units may also be configured as part of the CPU.

It should be noted that although user input devices 705 and peripheral devices 710 may be employed, the payment object reader 700 may be embodied as an embedded, dedicated, and/or monitor-less (i.e., headless) device(s), wherein access would be provided over a network interface connection. Additionally, part or all peripheral devices may be integrated within the payment object reader 700.

Memory

Memory 714 may further include, but is not limited to, one or more components 748 that include programs that supplement applications or functions performed by the Payment object reader 700, database 750, operating system 752, random access memory (RAM) 754, read only memory (ROM) 756, and storage device 730, etc., into which data may be saved that serves, amongst other things, as repository for storing data pertinent to functioning of the components.

The payment object reader 700 may employ various forms of memory 614, such as ROM 754, and a storage device 730. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like.

PPS Components

The memory 714 may contain a collection of program and/or database components and/or data such as, but not limited to: operating system component(s) 752 (operating system); information server component(s) 758 (information server); user interface component(s) 708 (user interface); Web browser component(s) 760 (Web browser); database(s) 750; cryptographic server component(s) 762 (cryptographic server); the component(s) 748; and/or the like (i.e., collectively a component collection). These components 748 may be stored and accessed from the storage devices and/or from storage devices accessible through an interface bus 718.

Operating System

The operating system component 752 is an executable program component facilitating the operation of the payment object reader 700. The operating system can facilitate access of I/O, network interfaces, peripheral devices, storage devices, and/or the like. In various embodiments, any number of current or future operating systems may be supported such as: any highly fault tolerant, scalable, portable, ROMable, real-time, deterministic, multitasking and secure kernels systems, e.g., μC/OS-III, μC/OS-III, Apple Macintosh OS X (Server); Unix and Unix-like system distributions; Linux distributions; limited and/or less secure operating systems, e.g., Apple Macintosh OS, Microsoft Windows XP, Windows Server 2003, Windows Server 2008, Windows Server 2012, Windows Vista®, Windows 7, and Windows 8, Blackberry OS (e.g., Blackberry 10), Firefox OS, Sailfish OS, Tizen, Ubuntu Touch OS, Chrome OS, iPhone OS (e.g. iOS), Windows Mobile (e.g. Windows 10 Mobile), Google Android (e.g. Lollipop 5.1); and/or the like. In various embodiments of the present subject matter, the operating system may be a multi-threaded multi-tasking operating system. Accordingly, inputs and/or outputs from and to a display and inputs/or outputs to physical sensors may be processed in parallel processing threads. In other embodiments, such events or outputs may be processed serially, or the like.

Inputs and outputs from other functional blocks may also be processed in parallel or serially, in other embodiments, such as image acquisition device and physical sensors.

The operating system 752 may provide communications protocols that allow the payment object reader 700 to communicate with other entities through a communications network 713. Various communication protocols may be used by the payment object reader 700 as a subcarrier transport mechanism for interaction, such as, but not limited to: multicast, TCP/IP, UDP, unicast, and/or the like.

Information Server

The information server 758 may: support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols; provide results in the form of Web pages to Web browsers; and allows for the manipulated generation of the Web pages through interaction with other program components.

Web Browser

A Web browser component 760 is a stored program component that is executed by a CPU. The Web browser may be a hypertext viewing application such as Google Chrome or Macintosh Safari. Web browsers and like information access tools may be integrated into PDAs, cellular telephones, and/or other mobile devices. Also, in place of a Web browser and information server, a combined application may be developed to perform similar operations of both. The combined application would similarly affect the obtaining and the provision of information to users, user agents, and/or the like from the enabled nodes. The web browser may be coupled to a web server (not shown). In other implementations, the payment object reader 700 may host a website (hereinafter, "system website") that includes one or more graphical user interfaces (GUIs) for organizing and presenting content to users. For example, through the system website, users create account logins to connect to their social identities (e.g., social profiles or social accounts), read content (e.g., messages, comments, posts), create or post content, communicate in real-time with other users (e.g., chat), and/or otherwise engage or interact with other users of the system website (e.g., "friends," "followers," "social contacts," or other types of social network connections). In some embodiments, the user interactions on the system website lead to internal API communication, which involves the Payment object reader 700 monitoring the user interactions for an indication of an intent to transfer money, sending, in response to such indication, requests (e.g., POST or GET requests) to the API of the server(s) to query the database(s) 750, and displaying the data returned by the API of the server(s) as appropriate. The indication of the intent is determined may be based on an identification of a user input, e.g., a string of characters, that has a particular syntax, the syntax being a monetary indicator preceding one or more alphanumeric characters. The user input having the syntax operates as a trigger to send money to a payment proxy represented by the user input.

User Interface

The user interface 708 may allow for the display, execution, interaction, manipulation, and/or operation of program components and/or system facilities through textual and/or graphical facilities through one or more interaction interface elements, such as check boxes, cursors, menus, scrollers, and windows (collectively and commonly referred to as widgets) to facilitate the access, capabilities, operation, and display of data and computer hardware and operating system resources, and status. Graphical user interfaces (GUIs) 708 may be used to provide a baseline and means of accessing and displaying information graphically to users. The user interface may also be a graphic user interface as provided by, with, and/or atop operating systems and/or operating environments such as already discussed.

Cryptographic Server

A cryptographic server component 762 is a stored program component that is executed by a CPU 716, cryptographic processor 742, cryptographic processor interface 728, cryptographic processor device 731, and/or the like, to enable encryption schemes allowing for the secure transmission of information across a communications network to enable the PPS. components to engage in secure transactions. The cryptographic server 762 facilitates the secure accessing of resources on the PPS and facilitates the access of secured resources on remote systems; i.e., it may act as a client and/or server of secured resources. Cryptographic processor interfaces 728 can allow for expedition of encryption and/or decryption requests by the cryptographic component. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Secure Socket Layer (SSL), Secure Hypertext Transfer Protocol (HTTPS), and/or the like. Employing such encryption security protocols, the payment object reader 700 may encrypt all incoming and/or outgoing communications.

The Payment object reader 700 may be associated with a secure enclave unit (not shown) that may represent any logic, circuitry, hardware, or other structures for creating and maintaining a secured, protected, or isolated environment, in which an application or other software may run, execute, be loaded, or otherwise be present an information processing system. The secure enclave unit may further include encryption unit (not shown), which may include any logic, circuitry, or other hardware to execute any one or more encryption algorithms and the corresponding decryption algorithms, and may include logic, circuitry, or other hardware shared with another encryption unit in processor. In one embodiment, the secure enclave unit includes the digital signatures, and biometric payment instruments created thereof.

Database

The database component 750 may be a fault tolerant, relational, scalable, secure database, such as Oracle or Sybase. Alternatively, the database 750 may be implemented using various data-structures, such as an array, hash, (linked) list, struct, structured text file (e.g., XML), table, and/or the like. Such data-structures may be stored in memory and/or in structured files. In another alternative, an object-oriented database may be used. Also, the database may be implemented as a mix of data structures, objects, and relational structures.

In one embodiment, the database 750 includes several data tables 750A-E. A payload table 750A includes fields such as, but not limited to: payload information, payment parameters, and/or the like. A mapping data table 750B includes fields such as, but not limited to: mapping tables storing association between the payment objects and devices, digital signatures, or the relationship between payment objects and a plurality of devices, so cluster information. A location data table 750C includes fields such as, but not limited to: signal strength, and the like. A sensor data table 750D includes fields such as, but not limited to: payment card detected, payment card received, beacon activated, beacon deactivated, etc. An other data table 750E includes fields such as, but not limited to: relationship between a communication protocol and component to execute, test sequences, data deletion sequence, and the like.

In one embodiment, specific tables may be created when each of the components are executed. Furthermore, the tables may be stored temporarily or permanently in the database 750.

Components

The component(s) 748 is a stored program component that is executed by the CPU 716. In one embodiment, the PPS component 748 incorporates any and/or all combinations of the aspects of the payment object reader 700 that was discussed in the previous figures. As such, the payment object reader 700 affects accessing, obtaining and the provision of information, services, transactions, and/or the like across various communications networks.

Examples of components include, but are not limited to, Signal Conditioning and Monitoring component(s) 764, Authentication component(s) 766, POS component(s) 768, location component 770, API component 771, Device Detection Component 772, mapping component(s) 774, and other component(s) 776. The signal conditioning and monitoring component 764 receives data from the device characteristics obtained from the device during registration, and removes noise or other irrelevant parameters. The authentication component 766 may allow and enable the payment object reader 700 to authenticate the digital device fingerprints as valid payment instruments once the registration is confirmed. The authentication component 766 configured to associate one or more conditions with the digital device fingerprint, wherein the conditions include at least one of: a time period within which the communication device is accessible to a payee as the valid authentication instrument; a particular payee requesting the payment transaction; a particular category of the merchant requesting the payment transaction; a particular location from where the payer is requesting the payment transaction; a predefined limit of the payment transaction; the identity of the payer making the purchase; and a particular type of goods or services corresponding to the payment transaction.

The POS component 768 may allow and enable the payment object reader 700 to accept payment object data, e.g., from the credit card or NFC based payment methods, and process or transfer the transaction data to an external server, such as a payment processing system and financial network system, to obtain financial account information of users to fulfill a transaction. The location component(s) 770 tracks the user's mobile device and the merchant point of sale device to push information based on proximity through for example, short-range communication networks, such as Bluetooth, BLE, and NFC technologies. The API component 671 allows and enables the payment object reader 700 to create APIs for functionalities such as determining which protocols or ports are available in proximate devices, which devices are proximate, for creating receipts, associating rewards, recording loyalty points, etc.

The device detection component 772 generates, sometimes on-the-fly, payloads and detection sequences, for example based on the communication protocol or ports that the mobile device is designed to operate on. The component 772 also creates a digital signature of the data received from the characteristics and converts it into tokenized information. Not all data is used. For this the component may interact with a communication protocol layer. The device detection component 772 can also apply a tokenization technique to generate a signature or representation of the imprint in response to the captured fingerprint. It does so in the form of discrete cosine transform (DCT) coefficients, and creates feature vectors. The device detection component 772 can also apply tokenized pseudo-random numbers (also referred to as hash keys) to the feature vectors to generate the digital signature. A National Institute of Standard and Technology (NIST) compliant True Random Number Generator (TRNG) can generate the pseudo-random numbers.

The device detection component 772 can encrypt the minutiae sets based on keys generated by a cryptographic unit (not shown). Examples of keys include authentication keys, which include SCP03 master keys (Message Authentication Code Key: MAC, Encryption Key: ENC and Key Encryption Key: KEK, which are 256-bit Advanced Encryption Standard (AES) symmetric keys with associated key derivation data) or Key Agreement Keys (e.g., user server signature verification public key, user server static public key, user static key pair with both public and private key).

The device detection component 772 can also create the digital signature or an encrypted fingerprint using other schemes, such as fuzzy vault algorithm, a cancelable fuzzy vault scheme based on irreversible hash functions, fingerprint minutiae algorithms based on a thinned fingerprint image as opposed to an original fingerprint image using hash functions, such as hash functions, such as MD, RIPEMD, and SHA.

The mapping component(s) 774 may allow and enable the payment object reader 700 to map the digital signatures to financial card information or buyer profiles. The mapping component 774 may also allow the payment object reader 700 to generate a dynamic digital signature based on a randomly generated token changing with time of day, merchant location, etc. The other component(s) 776 may enable and allow processing of data/signals required by the payment object reader 700.

The structure and/or operation of any of the payment object reader 700 components may be combined, consolidated, and/or distributed in any number of ways to facilitate development and/or deployment. To this end, one may integrate the components into a common code base or in a facility that can dynamically load the components on demand in an integrated fashion. The components may be consolidated and/or distributed in countless variations through standard data processing and/or development techniques. Multiple instances of any one of the program components may be instantiated on a single node, and/or across numerous nodes to improve performance through load-balancing and/or data-processing techniques. Furthermore, single instances may also be distributed across multiple controllers and/or storage devices; e.g., databases.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components. The grammar syntax itself may be presented as structured data that is interpreted and/or otherwise used to generate the parsing mechanism. Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

Regarding the process 300, 400, 500, and 600 while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further, any specific numbers noted herein are only examples; alternative implementations can employ differing values or ranges.

While aspects of the described subject matter can be implemented in any number of different systems, circuitries, environments, and/or configurations, the embodiments are described in the context of the following exemplary system(s) and configuration(s). The descriptions and details of well-known components are omitted for simplicity of the description. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof. Some recurring terms are now described. These definitions should not be considered limiting.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, note that the terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

In some implementations, the network(s) may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks may include both wired and/or wireless communication technologies, including Bluetooth®, Bluetooth® low energy, Wi-Fi and cellular communication technologies like worldwide interoperability for microwave access (Wi-MAX), 3G, 4G, CDMA, digital subscriber line (DSL), etc., cloud computing technologies, as well as wired or fiber optic technologies. Additionally, the communication network may be a mesh network. For example, in a wireless local area network (WLAN), network devices may be configured to receive and forward communications which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP. Components used for such communications can depend at least in part upon the type of network, the environment selected, or both. Protocols for communicating over such networks are well known and are not discussed herein in detail.

The term "component," "module" or "engine" refers broadly to general or specific-purpose hardware, software, or firmware (or any combination thereof) components. Components and engines are typically functional components that can generate useful data or other output using specified input(s). A component or engine may or may not be self-contained. Depending upon implementation-specific or other considerations, the components or engines may be centralized or functionally distributed. An application program (also called an "application") may include one or more components and/or engines, or a component and/or engine can include one or more application programs.

What is claimed is:

1. A computer-implemented method of processing a payment transaction between a buyer and a merchant associated with a point-of-sale (POS) terminal, the method comprising:
receiving information associated with at least one payment object, the at least one payment object having been read by a payment card reader in the payment transaction, the payment card reader communicatively coupled to the POS terminal, wherein the payment card reader and the POS terminal together form a POS system for processing the payment transaction;
transmitting, by the payment card reader and to a communication device that is within a communication range of the payment card reader, one or more command and control parameters that place the communication device in a detect mode, wherein the communication range is based at least in part on a radio frequency (RF) communication protocol;
detecting, via a RF transceiver of the payment card reader and in response to transmitting the one or more command and control parameters, the communication device within a communication range of the payment card reader, wherein the communication range is based at least in part on a RF communication protocol;
establishing, as per the RF communication protocol, a communication channel between the payment card reader and the communication device;
obtaining, by the payment card reader and through the communication channel, at least one device characteristic corresponding to the communication device, wherein the at least one device characteristic comprises at least one of a timing parameter, radiated performance, radio frequency response, and an engineering tolerance;
generating, by the payment card reader, a profile of the communication device, the profile comprising a device-payment object relationship based at least in part on the at least one device characteristic and information associated with the at least one payment object;
transmitting the profile of the communication device to a payment processing system communicatively coupled to the payment card reader;
comparing, by the payment processing system, the profile of the communication device with a buyer profile stored within a database, wherein the buyer profile includes an association of a previously obtained device characteristic with information identifying a previously received payment object;
determining that the profile of the communication device has been deemed substantially similar to the buyer profile; and
authorizing, via the payment processing system and through presence of the communication device, the payment transaction, wherein the authorizing includes transfer of an amount of funds corresponding to the payment transaction from a financial account of the buyer to a financial account of the merchant.

2. The method of claim 1, further comprising:
establishing a second communication channel between the POS terminal and the communication device;
obtaining, by the POS terminal and through the second communication channel, the at least one device characteristic corresponding to the communication device;
generating, by the POS terminal, a second profile of the communication device based at least in part on the at least one device characteristic from the POS terminal and the information associated with the at least one payment object;
transmitting the second profile of the communication device to a payment processing system communicatively coupled to the POS terminal;
corroborating, using the payment processing system, the second profile;
determining another device separate from the communication device, based at least in part on the corroboration; and
recalibrating the authorizing based at least in part on the corroboration.

3. The method of claim 1, wherein the generating the profile of the communication device comprises generating the profile of the communication device using a tokenization technique.

4. A computer-implemented method of processing a payment transaction between a buyer and a merchant using a payment system, the method comprising:
detecting at least one transaction activity associated with the payment system, wherein the payment system includes at least a payment object reader and a point-of-sale (POS) terminal;
transmitting, by the payment object reader and to a communication device that is within a communication range of the payment object reader, one or more command and control parameters that place the communication device in a detect mode;
detecting, by the payment object reader and in response to transmitting the one or more command and control parameters, the communication device;
establishing a communication channel between the payment object reader and the communication device, wherein the communication range is based at least in part on a communication protocol;
obtaining, through the communication channel, at least one device characteristic corresponding to the communication device, wherein the at least one device characteristic includes at least one of a timing parameter, radiated performance, radio frequency response, and an engineering tolerance;
generating, by the payment system, a digital signature of the communication device based at least in part on the device characteristic and information related to a payment object;
determining that the digital signature of the communication device has been deemed substantially similar to an existing digital signature in a database, wherein the existing digital signature includes an association of a previously obtained device characteristic with information identifying a previously received payment object;
determining that the existing digital signature has been deemed substantially similar to the digital signature of the communication device; and authorizing the payment transaction through presence of the communication device.

5. The method of claim 4, wherein the transaction activity includes one of (a) the payment object being introduced in proximity to the payment system; (b) accessing a payment account; (c) retrieving a transaction history; (d) approving authenticity of an action; and (e) detecting the payment transaction.

6. The method of claim 4, further comprising transmitting the digital signature of the communication device to a payment processing system communicatively coupled to the payment system.

7. The method of claim 4, further comprising storing the digital signature in the database.

8. The method of claim 4, wherein establishing the communication channel between the payment object reader and the communication device includes:
detecting a list of available communication ports of the communication device; and
selecting a communication port from amongst the available communication ports for communicating with the communication device.

9. The method of claim 4, further comprising:
establishing one or more communication channels between a plurality of components within the payment object reader and the communication device through a communication port;
obtaining, by each of the plurality of components and through the one or more communication channels, the at least one device characteristic corresponding to the communication device;
generating, by each of the plurality of components, instances of digital signatures corresponding to the communication device based at least in part on the at least one device characteristic;
corroborating the instances of the digital signatures to determine the authenticity of the communication device in relation to the transaction activity.

10. The method of claim 9, further comprising:
determining another component separate from the communication device, based at least in part on the corroboration; and
recalibrating the authorization of the payment transaction based at least in part on the corroboration.

11. The method of claim 4, wherein the authorizing further comprises:
detecting a second communication device within the communication range of the payment object reader;
obtaining, from the second communication device, a device characteristic corresponding to the second communication device;
generating an aggregated digital signature of the communication device based at least in part on the at least one device characteristic from the communication device and the device characteristic corresponding to the second communication device; and
authorizing the payment transaction based at least in part on the aggregated digital signature.

12. The method of claim 4, further comprising determining that the existing digital signature includes device characteristics from a cluster of communication devices besides the communication device.

13. The method of claim 4, further comprising storing the digital signature of the communication device within a secure enclave in the payment object reader, wherein the digital signature is retrieved from the secure enclave during the payment transaction involving the buyer.

14. The method of claim 4, further comprising:
receiving a request for authorization of the transaction activity on a most proximate payment system in response to a determination of a current geographical location of the communication device and a proximate payment system based at least in part on a current geographical location of neighboring payment systems with respect to the communication device;
establishing one or more communication links with a payment processing system and through the most proximate payment system to send a confirmation message to the communication device, the confirmation message including a confirmation link; and
sending, to the payment processing system, an indication of buyer engagement with the confirmation link, wherein the buyer engagement includes an additional identifier selected from a group of a buyer name, a buyer address, a buyer email address, a buyer phone number, a buyer social security number, a passcode set at the time of registration of the communication device, and a transaction detail, wherein a transfer of a money transfer amount is authorized in response to the payment processing system having received the indication of the buyer engagement.

15. The method of claim 6, further comprising:
storing the digital signature of the communication device in the payment processing system; and
using the digital signature along with the communication device to validate subsequent payment transactions.

16. The method of claim 4, further comprising:
sending a request to the communication device for authorization of the payment transaction upon entry or exit into a geo-fence associated with the payment object reader.

17. The method of claim 16, further comprising creating one or more conditions to be applied during authorization of the payment transaction, wherein the one or more conditions include at least one of: a time period within which the communication device is authorized; a particular merchant requesting the authorization; a particular category of the merchant requesting the authorization; a particular location from where the buyer is requesting the authorization; a predefined limit of the authorization; an identity of the buyer making the purchase; and a particular type of goods or services corresponding to the payment transaction.

18. A payment system for facilitating a proximity payment transaction through a computing device, the payment system comprising:
a point-of-sale (POS) terminal; and
a payment object reader comprising:
a memory;
a device detection component having electronics configured to:
transmit, to one or more communication devices that are within a communication range of the payment object reader, one or more command and control parameters that place the one or more communication devices in a detect mode, wherein the communication range is based at least in part on a wireless communication protocol;
detect, via the payment object reader and in response to transmitting the one or more command and control parameters, the one or more communication devices;
establish, as per the wireless communication protocol, a communication channel with the one or more communication devices in response to a transaction activity;
obtain, through the communication channel, a device characteristic of a communication device of the one or more communication devices associated with a payer in response to a payment object being introduced in proximity to the payment system, the device characteristic including at least one of a timing parameter, radiated performance, radio frequency response, and an engineering tolerance; and
generate a digital signature of the communication device based at least in part on the device characteristic and information related to the payment object; and
a processor configured to execute instructions stored in the memory to communicate the digital signature to a payment processing system for one of registration of the device characteristic as a valid payment authentication instrument or validation of the device characteristic as the valid payment authentication instrument based at least in part on comparison between a set of registered digital signature, and wherein the validation authorizes transfer of funds between the payer and a payee based at least in part on the payment transaction.

19. The payment system of claim 18, wherein the payment object reader further comprises an authentication component configured to associate one or more conditions with the digital signature of the communication device, wherein the one or more conditions include at least one of: a time period within which the communication device is accessible to the payee as the valid payment authentication instrument; a particular payee requesting the payment transaction; a particular category of the merchant requesting the payment transaction; a particular location from where the payer is requesting the payment transaction; a predefined limit of the payment transaction; an identity of the payer making a purchase; and a particular type of goods or services corresponding to the payment transaction.

20. The payment system of claim 18, wherein the transaction activity includes one of (a) the payment object being introduced in proximity to the payment system; (b) accessing a payment account; (c) retrieving a transaction history; (d) approving authenticity of an action; and (e) detecting the payment transaction.

21. The payment system of claim 18, wherein the device detection component is further configured to:
detect at least a second communication device of the one or more communication devices within the communication range of the payment system;
establish a second communication channel with the second communication device;
obtain, from the second communication device and through the second communication channel, a device characteristic corresponding to the second communication device;
generate, an aggregated digital signature based at least in part on the device characteristic from the communication device and the device characteristic corresponding to the second communication device; and
authorize the payment transaction based at least in part on the aggregated digital signature.

22. The payment system of claim 18, wherein the device detection component is further configured to delete the digital signature of the communication device after the payment transaction is processed.

23. The payment system of claim 18, wherein the payment system is at least one of: a cell phone, an electronic handheld device, a payment object reader or a point of sale terminal.

24. The payment system of claim 18, wherein the device detection component is further configured to:
- detect a list of available communication ports of the communication device;
- select a communication port from amongst the available communication ports for communicating with the communication device;
- establish one or more communication channels between a plurality of components within the payment system and the communication device through the selected communication port;
- obtain, by each of the plurality of components and through the one or more communication channels, the device characteristic corresponding to the communication device;
- generate, by each of the plurality of components, instances of digital signatures corresponding to the communication device based at least in part on the device characteristic; and
- corroborate the instances of the digital signatures to determine the authenticity of the communication device in relation to the transaction activity.

25. One or more non-transitory computer-readable media maintaining instructions of a first instance of an application that, when executed by one or more processors, cause the one or more processors to:
- detect at least one transaction activity associated with a payment system having a payment object reader and a point-of-sale (POS) terminal;
- transmit, by the payment object reader and to a communication device that is within a communication range of the payment object reader, one or more command and control parameters that place the communication device in a detect mode, wherein the communication range is based at least in part on a communication protocol;
- detect, via the payment object reader and in response to transmitting the one or more command and control parameters, the communication device;
- establish a communication channel between the payment object reader and the communication device;
- obtain, through the communication channel at least one device characteristic corresponding to the communication device, wherein the at least one device characteristic includes at least one of a timing parameter, radiated performance, radio frequency response, and an engineering tolerance;
- generate a digital signature of the communication device based at least in part on the at least one device characteristic and information related to a payment object;
- determine that the digital signature of the communication device has been deemed substantially similar to an existing digital signature in a database, wherein the existing digital signature includes an association of a previously obtained device characteristic with information identifying a previously received payment object;
- determine that the existing digital signature has been deemed substantially similar to the digital signature of the communication device; and
- authorize the payment transaction through presence of the communication device.

26. The one or more non-transitory computer readable media of claim 25, wherein the instructions, when executed by one or more processors, further cause the one or more processors to:
- detect a list of available communication ports of the communication device;
- select a communication port from amongst the available communication ports for communicating with the communication device;
- establish one or more communication channels between a plurality of components within the payment system and the communication device through the communication port;
- obtain, by each of the plurality of components and through the one or more communication channels, the device characteristic corresponding to the communication device;
- generate, by each of the plurality of components, instances of digital signatures corresponding to the communication device based at least in part on the device characteristic; and
- corroborate the instances of the digital signatures to determine the authenticity of the communication device in relation to the transaction activity.

* * * * *